US012062314B2

(12) United States Patent
Gao

(10) Patent No.: US 12,062,314 B2
(45) Date of Patent: Aug. 13, 2024

(54) COMPENSATION METHOD FOR DISPLAY PANEL AND DISPLAY DEVICE

(71) Applicant: WUHAN TIANMA MICRO-ELECTRONICS CO., LTD., Wuhan (CN)

(72) Inventor: Xiangyu Gao, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/164,400

(22) Filed: Feb. 3, 2023

(65) Prior Publication Data

US 2023/0186815 A1 Jun. 15, 2023

(30) Foreign Application Priority Data

Sep. 26, 2022 (CN) ........................ 202211172985.7

(51) Int. Cl.
*G09G 3/20* (2006.01)

(52) U.S. Cl.
CPC ... *G09G 3/2003* (2013.01); *G09G 2320/0233* (2013.01); *G09G 2320/0242* (2013.01); *G09G 2320/0271* (2013.01); *G09G 2360/16* (2013.01)

(58) Field of Classification Search
None
See application file for complete search history.

(56) References Cited

U.S. PATENT DOCUMENTS 5,933,199 A * 8/1999 Yoon ...................... H04N 5/202 348/790
9,905,168 B1 * 2/2018 Richards .............. G09G 3/3648
11,626,086 B1 * 4/2023 Hei .......................... G09G 5/10 345/690
2003/0034941 A1 * 2/2003 Janssen .................. G09G 3/006 345/87
2010/0026731 A1 * 2/2010 Konuma .................. H04N 9/69 345/690

(Continued)

FOREIGN PATENT DOCUMENTS

CN 110277058 A 9/2019
CN 110444151 B 3/2021

*Primary Examiner* — Patrick N Edouard
*Assistant Examiner* — Peijie Shen
(74) *Attorney, Agent, or Firm* — CHRISTENSEN O'CONNOR JOHNSON KINDNESS PLLC

(57) ABSTRACT

Provided are a compensation method for a display panel and a display device. The compensation method for a display panel includes: obtaining a first display grayscale obtained to be displayed in a to-be-displayed image by a first sub-pixel, and obtaining a first display data voltage corresponding to the first display grayscale; determining whether the first display data voltage is greater than a low brightness demarcation voltage; and if yes, obtaining a first compensation data voltage corresponding to the first sub-pixel according to the first display grayscale; and determining, according to a lighting voltage corresponding to the first sub-pixel, whether the first compensation data voltage is in a dark-state voltage range; and if yes, compensating the first sub-pixel by using the lighting voltage corresponding to the first sub-pixel, and if not, compensating the first sub-pixel by using the first compensation data voltage.

16 Claims, 17 Drawing Sheets

(56) References Cited

U.S. PATENT DOCUMENTS

| | | | | |
|---|---|---|---|---|
| 2013/0257831 | A1* | 10/2013 | Kim | G09G 3/3266 345/205 |
| 2015/0235616 | A1* | 8/2015 | Wu | G09G 5/04 345/694 |
| 2018/0061314 | A1* | 3/2018 | Kim | G09G 3/3233 |
| 2019/0088199 | A1* | 3/2019 | Zhang | G09G 3/3233 |
| 2019/0088203 | A1* | 3/2019 | He | G09G 3/2074 |
| 2019/0096334 | A1* | 3/2019 | Li | H10K 59/1213 |
| 2020/0035152 | A1* | 1/2020 | Zhang | G09G 3/3225 |
| 2020/0111418 | A1* | 4/2020 | Nam | G09G 3/3233 |
| 2020/0152125 | A1* | 5/2020 | Ye | G09G 3/3258 |
| 2021/0049964 | A1* | 2/2021 | Yuan | G09G 3/3241 |
| 2021/0150965 | A1* | 5/2021 | Zhang | G09G 3/3208 |
| 2021/0335254 | A1* | 10/2021 | Kawashima | G09G 3/3233 |
| 2023/0108203 | A1* | 4/2023 | Hai | G09G 3/3611 345/690 |

* cited by examiner

COMPENSATION METHOD FOR DISPLAY PANEL AND DISPLAY DEVICE

CROSS-REFERENCE TO RELATED APPLICATIONS

The present application claims priority to Chinese Patent Application No. 202211172985.7, filed on Sep. 26, 2022, the content of which is incorporated herein by reference in its entirety.

TECHNICAL FIELD

The present disclosure relates to the technical field of display, and in particular, to a compensation method for a display panel and a display device.

BACKGROUND

In a process of manufacturing a display panel, instability of an excimer laser annealing process may have a negative effect on performance of a transistor. As a result, an image displayed by the display panel has poor brightness uniformity, leading to a mura phenomenon. In the related art, the mura phenomenon may be ameliorated in an external optical compensation manner. However, an effect of ameliorating the mura phenomenon is limited when using the existing compensation manner.

SUMMARY

In view of the above, embodiments of the present disclosure provide a compensation method for a display panel and a display device, which can ameliorate the mura phenomenon.

In an aspect, an embodiment of the present disclosure provides a compensation method for a display panel, including: obtaining a first display grayscale required to be displayed in a to-be-displayed image by a first sub-pixel, and obtaining a first display data voltage corresponding to the first display grayscale; determining whether the first display data voltage is greater than a low brightness demarcation voltage; and if yes, obtaining a first compensation data voltage corresponding to the first sub-pixel according to the first display grayscale; and determining, according to a lighting voltage corresponding to the first sub-pixel, whether the first compensation data voltage is in a dark-state voltage range; and if yes, compensating the first sub-pixel by using the lighting voltage corresponding to the first sub-pixel, and if not, compensating the first sub-pixel by using the first compensation data voltage.

In another aspect, an embodiment of the present disclosure provides a display device, including a display panel and a driving chip. The driving chip includes: a first display voltage acquisition module configured to obtain a first display grayscale required to be displayed in a to-be-displayed image by a first sub-pixel, and obtain a first display data voltage corresponding to the first display grayscale; a determining module electrically connected to the first display voltage acquisition module, and configured to determine whether the first display data voltage is greater than a low brightness demarcation voltage, and if yes, issue a first control instruction; a compensation voltage acquisition module electrically connected to the first display voltage acquisition module and the determining module, respectively, and configured to obtain a first compensation data voltage corresponding to the first sub-pixel according to the first display grayscale when the first control instruction is received; and a compensation module electrically connected to the first display voltage acquisition module and the compensation voltage acquisition module, respectively, and configured to determine, according to a lighting voltage corresponding to the first sub-pixel, whether the first compensation data voltage is in a dark-state voltage range; and if yes, compensate the first sub-pixel by using the lighting voltage corresponding to the first sub-pixel, and if not, compensate the first sub-pixel by using the first compensation data voltage.

One of the above technical solutions has the following beneficial effects.

When it is determined according to the lighting voltage corresponding to the first sub-pixel that the first compensation data voltage is in a dark-state voltage range, indicating that the first compensation data voltage is excessively large, a pixel circuit in the first sub-pixel, after receiving the first compensation data voltage, can transfer a driving current smaller than a threshold current to a light-emitting element. As a result, the light-emitting element does not emit light, causing the first sub-pixel to display a black dot after compensation. Therefore, according to the embodiments of the present disclosure, when it is determined that the first compensation data voltage is in a dark-state voltage range, the lighting voltage corresponding to the first sub-pixel is selected to compensate the first sub-pixel, so that the first sub-pixel after compensation can emit light slightly (i.e., not completely emit no light), thereby ameliorating a color cast phenomenon to some extent.

Moreover, pixel circuits in different sub-pixels of the display panel have a same structure. Therefore, a lighting voltage corresponding to the sub-pixel is only related to a threshold current of the light-emitting element, and the threshold current is only related to device characteristics of the light-emitting element. That is, the lighting voltages corresponding to the sub-pixels having a same color are all identical. Therefore, even if the display panel includes a plurality of display brightness values (DBVs), for the sub-pixels having a same color, lighting voltages of the sub-pixels under the plurality of DBVs are constant.

Therefore, according to the technical solutions in the embodiments of the present disclosure, when it is determined, according to the lighting voltage corresponding to the first sub-pixel, whether the first compensation data voltage is in a dark-state voltage range, only several lighting voltages are required to be pre-configured for sub-pixels having different colors, which greatly reduces an amount of data required to be stored under a premise of effectively alleviating the color cast after low-grayscale compensation.

BRIEF DESCRIPTION OF DRAWINGS

In order to better illustrate technical solutions in embodiments of the present disclosure, the accompanying drawings used in the embodiments are briefly introduced as follows. It should be noted that the drawings described as follows are merely part of the embodiments of the present disclosure, and other drawings can also be obtained by those skilled in the art without paying creative efforts.

DESCRIPTION OF EMBODIMENTS

Figure 1:
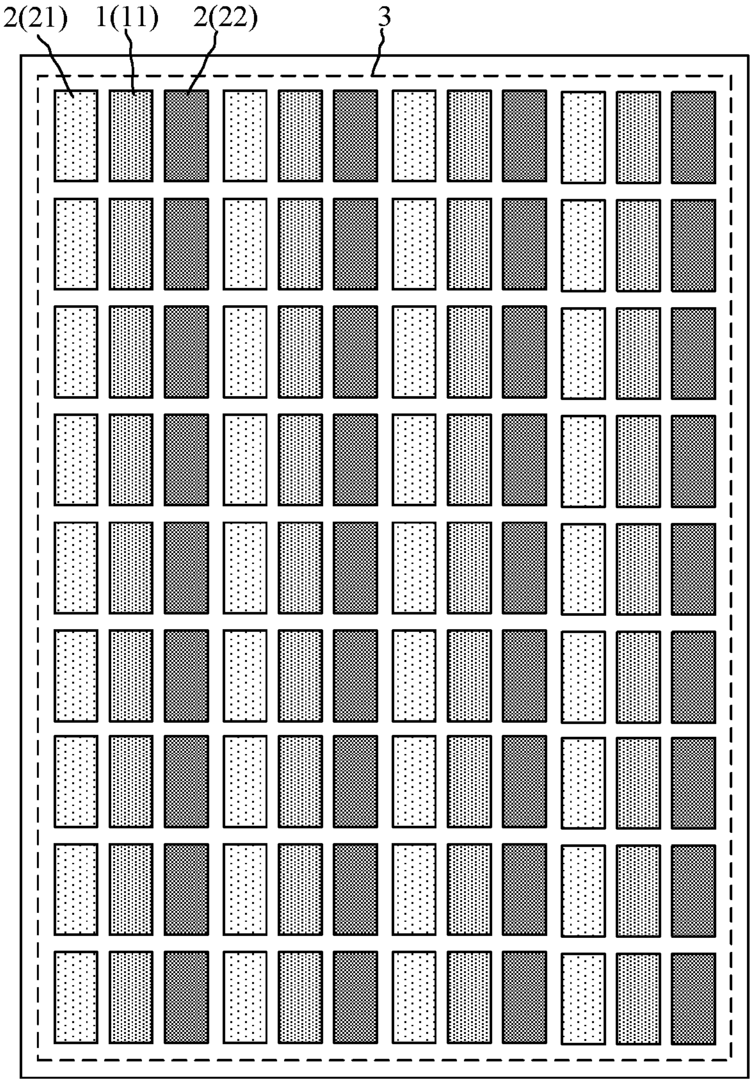
FIG. 1 is a top view of a display panel according to an embodiment of the present disclosure.

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as limiting the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

A compensation method in the related art may include the following steps.

In step K1, brightness data of each sub-pixel under a plurality of test grayscales is obtained by photographing.

In step K2, a compensation coefficient offset of each sub-pixel under one of the plurality of test grayscales is calculated according to the obtained brightness data. For one sub-pixel, the calculated compensation coefficient offset may be used as a compensation coefficient corresponding to the sub-pixel under 256 grayscales.

In step K3, an actual compensation value offsetReal of a compensation sub-pixel is obtained according to offsetReal=offset×Gain. Herein, G1 denotes a display grayscale required to be displayed in a to-be-displayed image by the compensation sub-pixel, and Gain denotes a correction coefficient of the compensation sub-pixel under the display grayscale. The correction coefficient Gain is a positive number greater than 0. Generally, the higher the grayscale, the smaller the corresponding correction coefficient Gain.

In step K4, a compensation grayscale G2 is calculated according to G2=G1+offsetReal, and then the compensation sub-pixel is compensated by using a compensation data voltage corresponding to the compensation grayscale G2.

It should be noted that, in step K2, the compensation coefficients offset calculated for different sub-pixels may be different from each other. For example, the display panel has a lighter region and a darker region, and a compensation coefficient offset of a sub-pixel in the brighter region may be negative under a test grayscale, for example, Scale −7. In this case, an actual compensation value offsetReal calculated according to the compensation coefficient offset is also smaller than 0, so that the sub-pixel in the brighter region is compensated downward to reduce actual brightness of the sub-pixel in the brighter region to such an extent that the actual brightness is close to average brightness. A compensation coefficient offset of a sub-pixel in the darker region may be positive under the test grayscale, for example, Scale 7. In this case, an actual compensation value offsetReal calculated according to the compensation coefficient offset is greater than 0, so that the sub-pixel in the darker region is compensated upward to increase actual brightness of the sub-pixel in the darker region to such an extent that the actual brightness is also close to average brightness. In this way, it can improve uniformity of overall brightness of the display panel.

In addition, in another example, for a red sub-pixel, a compensation coefficient offset of the red sub-pixel is Scale −7. If the red sub-pixel is required to display Grayscale 7 in the to-be-displayed image and a correction coefficient Gain corresponding to Grayscale 7 is 1, the red sub-pixel after compensation actually displays brightness of Grayscale 0 (i.e., 7+(−7*1)=0). If the red sub-pixel is required to display Grayscale 64 in the to-be-displayed image and a correction coefficient Gain corresponding to Grayscale 64 is 0.5, the red sub-pixel finally actually displays brightness of Grayscale 60 (i.e., 64+(−7*0.5)=60).

During research, the inventor has found that correction coefficients Gain corresponding to sub-pixels having a same color under a same grayscale are the same. When a low grayscale is displayed, for the sub-pixel whose compensation coefficient offset is negative and absolute value is relatively large, an actual compensation value offsetReal obtained by the compensation coefficient offset of the sub-pixel being multiplied by the correction coefficient Gain is also negative and the absolute value thereof is also relatively large. In this case, the sub-pixel may be compensated downward to a large extent, so that the sub-pixel is compensated to Grayscale 0 or even below Grayscale 0. As a result, the sub-pixel may directly display a block dot, thereby leading to color cast/deviation/offset. In an example, after compensation, a green sub-pixel may be over-compensated so that the green sub-pixel does not emit light, while the red sub-pixel is not over-compensated so that the red sub-pixel continues to emit light, thereby leading to color cast.

Therefore, in the existing compensation manner, a compensation effect under low grayscales is poor, and a capability to optimize a low-grayscale visual effect is limited.

In order to optimize the low-grayscale visual effect, an embodiment of the present disclosure provides a compensation method. In an embodiment, the compensation method may include the following steps.

In step H1: a display grayscale G1 required to be displayed by a compensation sub-pixel is obtained.

In step H2, the display grayscale G1 is compensated in a first compensation manner, to obtain a pre-compensation grayscale G2.

In step H3, it is determined whether the pre-compensation grayscale G2 is smaller than a pre-configured critical grayscale, if yes, step H4 is performed, and if not, step H5 is performed. The critical grayscale is a minimum calibration grayscale of a gamma curve, and can be configured according to an actual gamma curve of the display panel or customers' requirements on low-grayscale brightness display.

In step H4, secondary compensation is performed on the pre-compensation grayscale G2 in a second compensation manner, to obtain an actual compensation grayscale G3, and then the compensation sub-pixel is compensated by using a data voltage corresponding to the actual compensation grayscale G3.

In step H5, the compensation sub-pixel is compensated by directly using a data voltage corresponding to the pre-compensation grayscale G2.

In the above compensation manner, when it is determined that the pre-compensation grayscale G2 is smaller than the critical grayscale, the grayscale of the compensation sub-pixel may be compensated to be below the critical grayscale if the compensation sub-pixel is compensated by directly using the pre-compensation grayscale G2. Due to inaccurate calibration of the gamma curve for grayscale below the critical grayscale, the compensation for the compensation sub-pixel may be inaccurate. Therefore, secondary compensation may be performed in this case to obtain the actual compensation grayscale G3, and then the compensation sub-pixel is compensated according to the actual compensation grayscale G3.

However, based on further research, the inventor has found that, although accuracy of the compensation can be improved to some extent with the above compensation method, the display panel generally has a plurality of display brightness values (DBVs), and critical grayscales corresponding to different DBVs are different. If a critical grayscale is configured for each DBV, lots of critical grayscales may be required to be configured. For example, under a driving frequency of the display panel, a register 51 corresponds to 4096 DBVs, meaning that 4096 critical grayscales are required to be configured. When the display panel has a plurality of driving frequencies such as 60 Hz, 90 Hz, and 120 Hz, the number of critical grayscales required to be configured may be further increased, resulting in a large amount of stored data. However, if only one critical grayscale is configured for different DBVs, the configuration of the critical grayscale is inaccurate, leading to inaccurate compensation for the low grayscale.

Figure 2:
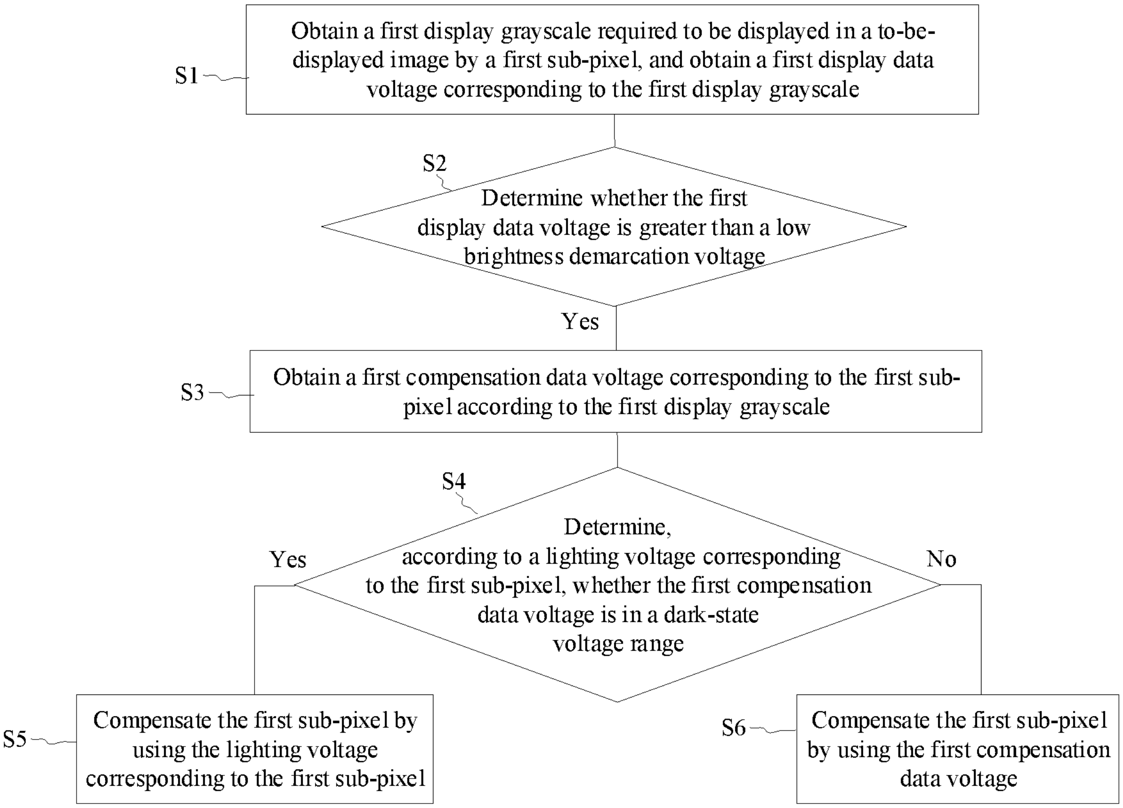
FIG. 2 is a flowchart of a compensation method for a display panel according to an embodiment of the present disclosure.

Therefore, an embodiment of the present disclosure further provides a compensation method for a display panel. FIG. 1 is a top view of a display panel according to an embodiment of the present disclosure, and FIG. 2 is a flowchart of a compensation method for a display panel according to an embodiment of the present disclosure. As shown in FIG. 1 and FIG. 2, in an embodiment, the compensation method may include the following steps.

In step S1, a first display grayscale G1_1 required to be displayed in a to-be-displayed image by a first sub-pixel 1 is obtained, and a first display data voltage V1_1 corresponding to the first display grayscale G1_1 is obtained.

In step S2, it is determined whether the first display data voltage V1_1 is greater than a low brightness demarcation voltage V_Cut, and if yes, step S3 is performed.

It should be noted that the low brightness demarcation voltage V_Cut corresponds to a critical grayscale. If a grayscale value of the critical grayscale is small, the critical grayscale may be compensated to Grayscale 0 or be below Grayscale 0 after downward compensation. When the display panel has a plurality of DBVs, grayscale-voltage mapping relationships corresponding to different DBVs may be different. Therefore, the low brightness demarcation voltage V_Cut may correspond to different critical grayscales under different DBVs.

In step S3, a first compensation data voltage V2_1 corresponding to the first sub-pixel 1 is obtained according to the first display grayscale G1_1.

In step S4, it is determined, according to a lighting voltage Vd_1 corresponding to the first sub-pixel 1, whether the first compensation data voltage V2_1 is in a dark-state voltage range; if yes, step S5 is performed, and if not, step S6 is performed.

In step S5, the first sub-pixel 1 is compensated by using the lighting voltage Vd_1 corresponding to the first sub-pixel 1.

In step S6, the first sub-pixel 1 is compensated by using the first compensation data voltage V2_1.

A sub-pixel in the display panel includes a pixel circuit and a light-emitting element that are electrically connected to each other. The light-emitting element emits light under an action of a driving current transferred thereto by the pixel circuit. The driving current transferred by the pixel circuit to the light-emitting element is related to a data voltage received by the pixel circuit. The higher the data voltage, the smaller the driving current transferred by the pixel circuit.

It can be understood that the light-emitting element corresponds to a threshold current, which is a light-emitting threshold current. The light-emitting element can emit light only when the driving current received by the light-emitting element is greater than or equal to the threshold current. The lighting voltage in the embodiments of the present disclosure refers to a data voltage corresponding to the threshold current.

When it is determined according to the lighting voltage Vd_1 corresponding to the first sub-pixel 1 that the first compensation data voltage V2_1 is in a dark-state voltage range, indicating that the first compensation data voltage V2_1 is excessively large, the pixel circuit in the first sub-pixel 1, after receiving the first compensation data voltage V2_1, may transfer a driving current smaller than the threshold current to the light-emitting element. As a result, the light-emitting element does not emit light, causing the first sub-pixel 1 to display a black dot after compensation. Therefore, according to the embodiments of the present disclosure, when it is determined that the first compensation data voltage V2_1 is in a dark-state voltage range, the first sub-pixel 1 is compensated by using the lighting voltage Vd_1 corresponding to the first sub-pixel 1, so that the first sub-pixel 1 after compensation can emit light slightly (i.e., not completely emit no light), thereby ameliorating a color cast phenomenon to some extent.

Moreover, pixel circuits in different sub-pixels of the display panel have identical structures. Therefore, lighting voltages corresponding to the sub-pixels are only related to a threshold current of the light-emitting element, and the threshold current is only related to device characteristics of the light-emitting element. That is, the lighting voltages corresponding to the sub-pixels having a same color are all identical. Therefore, even if the display panel includes a plurality of DBVs, for the sub-pixels having a same color, lighting voltages of the sub-pixels under the plurality of DBVs are constant.

Therefore, according to the compensation method according to the embodiments of the present disclosure, when it is determined, according to the lighting voltage Vd_1 corresponding to the first sub-pixel 1, whether the first compensation data voltage V2_1 is in a dark-state voltage range, only several lighting voltages are required to be pre-configured for sub-pixels having different colors, which greatly reduces an amount of data required to be stored under a premise of effectively alleviating the color cast after low-grayscale compensation.

Additionally, the related art provides that correction coefficients corresponding to sub-pixels having a same color under a same grayscale are the same, a problem of color cast may arise if the correction coefficient under a low grayscale is excessively large, while a problem of under-compensation may arise if the correction coefficient is excessively small. For example, when a sub-pixel displays a low grayscale, for the sub-pixel with a positive compensation coefficient and a small absolute value, if the compensation coefficient is small, an actual compensation value of the sub-pixel may also be small. Therefore, the sub-pixel can only be compensated upward to a lesser extent, thereby leading to under-compensation. However, according to the embodiments of the present disclosure, the problem of color cast under a low grayscale can be solved. Therefore, when a correction coefficient under a low grayscale is configured, the value of the correction coefficient can be appropriately increased so as to synchronously ameliorate the problem of under-compensation under a low grayscale, thereby further optimizing the low-grayscale visual effect.

In addition, it should be noted that, when it is determined whether the first sub-pixel 1 displays a low grayscale in a to-be-displayed image, if the first display grayscale G1_1 is directly compared with the critical grayscale, a respective critical grayscale is required to be pre-configured according to each DBV, leading to an excessively large storage amount; also, a DBV of the to-be-displayed image is required to be additionally obtained, leading to a relatively complicated comparison process. However, according to the embodiments of the present disclosure, the first display data voltage V1_1 is compared with the low brightness demarcation voltage V_Cut, that is, the comparison between grayscales is changed to the comparison between voltages. In this case, only a low brightness demarcation voltage V_Cut is required to be configured, thereby reducing an amount of stored data and simplifying the comparison process.

Figure 3:
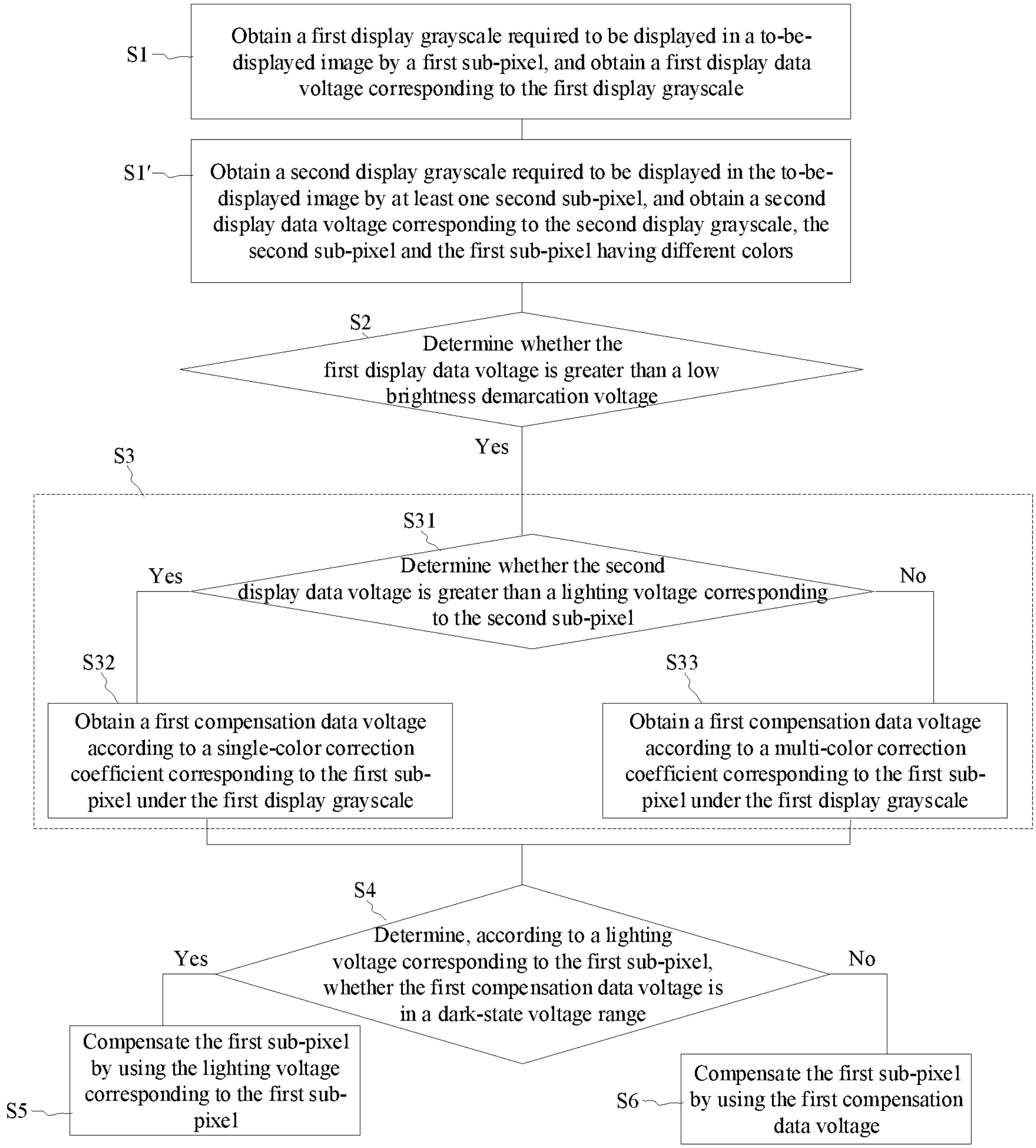
FIG. 3 is another flowchart of a compensation method for a display panel according to an embodiment of the present disclosure.

In a sample embodiment, referring to FIG. 1, as shown in FIG. 3, which is another flowchart of a compensation method for a display panel according to an embodiment of the present disclosure, the compensation method according to this embodiment of the present disclosure further includes the following steps.

In step S1', a second display grayscale G1_2 required to be displayed in a to-be-displayed image by at least one second sub-pixel 2 is obtained, and a second display data voltage V1_2 corresponding to the second display grayscale G1_2 is obtained, the second sub-pixel 2 and the first sub-pixel 1 having different colors. Step S1' may be performed prior to step S2 or subsequent to step S1.

According to this, in an embodiment, step S3 may include the following steps.

In step S31, it is determined whether the second display data voltage V1_2 is greater than a lighting voltage Vd_2 corresponding to the second sub-pixel 2; if yes, step S32 is performed, and if not, step S33 is performed.

In step S32, a first compensation data voltage V2_1 is obtained according to a single-color correction coefficient Gain_P corresponding to the first sub-pixel 1 under the first display grayscale G1_1.

In step S33, a first compensation data voltage V2_1 is obtained according to a multi-color correction coefficient Gain_M corresponding to the first sub-pixel 1 under the first display grayscale G1_1.

It should be noted that the single-color correction coefficient Gain_P may be pre-configured according to a single-color image, and the multi-color correction coefficient Gain_M may be pre-configured according to a multi-color image. The single-color image refers to an image displayed by sub-pixels having only one color that emit light, and the multi-color image refers to an image displayed by sub-pixels having two or more colors that emit light. In this embodiment of the present disclosure, a color of the single-color image is the same as a light-emitting color of the first sub-pixel 1. In an example, the display panel includes a red sub-pixel, a green sub-pixel, and a blue sub-pixel. If the first sub-pixel 1 is a red sub-pixel, the single-color correction coefficient Gain_P is pre-configured according to a red image.

In the related art, correction coefficients of sub-pixels are all configured according to a white display image, and then the sub-pixels are compensated only by using such correction coefficients. It can be understood that, under the white display image, sub-pixels having multiple colors all emit light which is blended into white light. However, when the sub-pixels having multiple colors all emit light, current leakage may exist between different sub-pixels. Therefore, the correction coefficients determined according to the white display image are configured by debugging under an influence of the current leakage of the sub-pixels. However, when the display panel displays a single-color image, the sub-pixels having only one color emit light, while the sub-pixels having any other color do not emit light. In this case, current leakage does not exist between the sub-pixels emitting light and the sub-pixels having any other color, so that an influence of the current leakage on the sub-pixels emitting light is different from an influence of the current leakage under the white display image. Then, in this case, compensating the single-color image according to the correction coefficient determined by the white display image may lead to inaccurate compensation, resulting in overcompensation or under-compensation for the sub-pixels, which is particularly obvious under a low grayscale.

Therefore, in this embodiment of the present disclosure, it can be determined whether the to-be-displayed image is a single-color image or a multi-color image by determining whether the second sub-pixel 2 having a different color from the first sub-pixel 1 emits light. When it is determined that the to-be-displayed image is a single-color image and the single-color correction coefficient Gain_P is called to obtain the first compensation data voltage V2_1, and the first compensation data voltage V2_1 matches the single-color image. When it is determined that the to-be-displayed image is a multi-color image and the multi-color correction coefficient Gain_M is called to obtain the first compensation data voltage V2_1, and the first compensation data voltage V2_1 matches the multi-color image. In this way, targeted compensation is performed on the single-color image and the multi-color image to improve compensation effects on the single-color image and the multi-color image, so as to optimize a visual effect of the display panel under a low grayscale.

Figure 4:
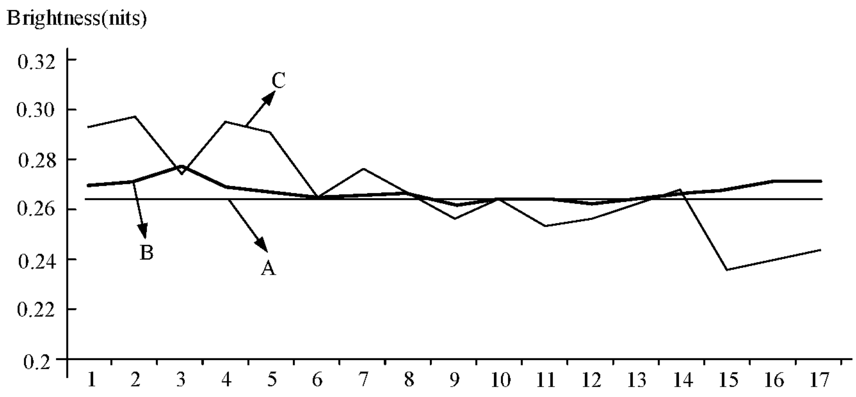
FIG. 4 is a schematic diagram of a test comparison between the related art and embodiments of the present disclosure.
Figure 5:
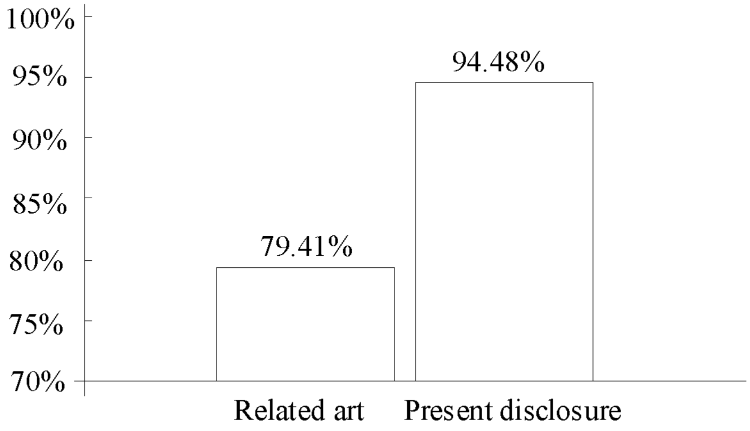
FIG. 5 is another schematic diagram of a test comparison between the related art and embodiments of the present disclosure.

In this regard, the display panel is compensated by testing according to a compensation manner in the related art and a compensation manner according to an embodiment of the present disclosure, and uniformity of brightness of the display panel is calculated by measuring brightness of seventeen positions. As shown in FIG. 4 and FIG. 5, FIG. 4 is a schematic diagram of a test comparison between the related art and embodiments of the present disclosure according to an embodiment of the present disclosure, and FIG. 5 is another schematic diagram of a test comparison between the related art and embodiments of the present disclosure, in which Line A in FIG. 4 represents target brightness, Line B in FIG. 4 represents brightness according to the embodiments of the present disclosure, and Line C in FIG. 4 represents brightness of the related art. It is found by testing that the uniformity of the brightness of the display panel is only 79% after the display panel is compensated with the compensation method in the related art, while the uniformity of the brightness of the display panel can be increased to more than 90% after targeted compensation on the single-color image and the multi-color image with the compensation method according to the embodiments of the present disclosure. The display panel according to the embodiments of the present disclosure can bring a better visual effect under a low grayscale.

Figure 6:
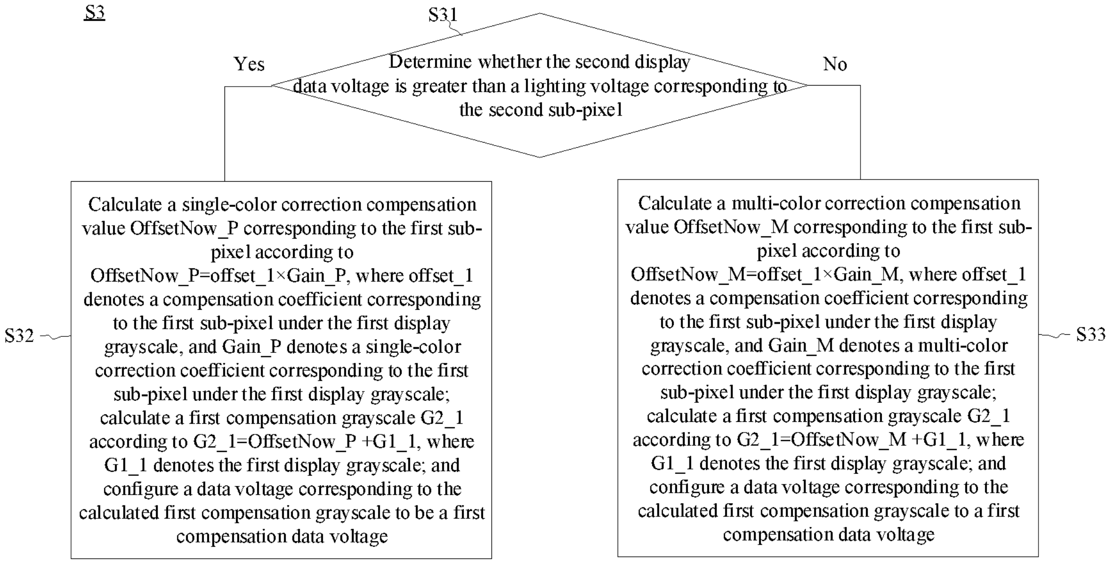
FIG. 6 is yet another flowchart of a compensation method for a display panel according to an embodiment of the present disclosure.

FIG. 6 is yet another flowchart of a compensation method for a display panel according to an embodiment of the present disclosure. In a sample embodiment, as shown in FIG. 6, step S32 may include: calculating a single-color correction compensation value OffsetNow_P corresponding to the first sub-pixel 1 according to OffsetNow_P=offset_1×Gain_P, where offset_1 denotes a compensation coefficient corresponding to the first sub-pixel 1 under the first display grayscale G1_1, and Gain_P denotes the single-color correction coefficient Gain_P corresponding to the first sub-pixel 1 under the first display grayscale G1_1; calculating a first compensation grayscale G2_1 according to G2_1=OffsetNow_P+G1_1, where G1_1 denotes the first display grayscale G1_1; and configuring a data voltage corresponding to the calculated first compensation grayscale to be the first compensation data voltage V2_1.

When it is determined that the to-be-displayed image is a single-color image, the first compensation grayscale can be obtained according to the calculated single-color correction compensation value OffsetNow_P, so that the further obtained first compensation data voltage V2_1 is the first compensation data voltage V2_1 that matches the single-color image. If compensation is performed subsequently by using the first compensation data voltage V2_1, the compensation effect on the single-color image can be optimized.

In a sample embodiment, referring to FIG. 6 again, for example, step S33 may include: calculating a multi-color correction compensation value OffsetNow_M corresponding to the first sub-pixel 1 according to OffsetNow_M=offset_1×Gain_M, where offset_1 denotes a compensation coefficient corresponding to the first sub-pixel 1 under the first display grayscale G1_1, and Gain_M denotes a multi-color correction coefficient Gain_M corresponding to the first sub-pixel 1 under the first display grayscale G1_1; calculating a first compensation grayscale G2_1 according to G2_1=OffsetNow_M+G1_1, where G1_1 denotes the first display grayscale G1_1; and configuring a data voltage corresponding to the calculated first compensation grayscale to be the first compensation data voltage V2_1.

When it is determined that the to-be-displayed image is a multi-color image, the first compensation grayscale can be obtained according to the calculated multi-color correction compensation value OffsetNow_M, so that the further obtained first compensation data voltage V2_1 is the first compensation data voltage V2_1 that matches the multi-color image. If compensation is performed subsequently by using the first compensation data voltage V2_1, the compensation effect on the multi-color image can be optimized.

In a sample embodiment, in combination with FIG. 1, the display panel includes a first-color sub-pixel 11, a second-color sub-pixel 21, and a third-color sub-pixel 22. The first sub-pixel 1 is the first-color sub-pixel 11, and the second sub-pixel 2 includes the second-color sub-pixel 21 and the third-color sub-pixel 22.

Figure 7:
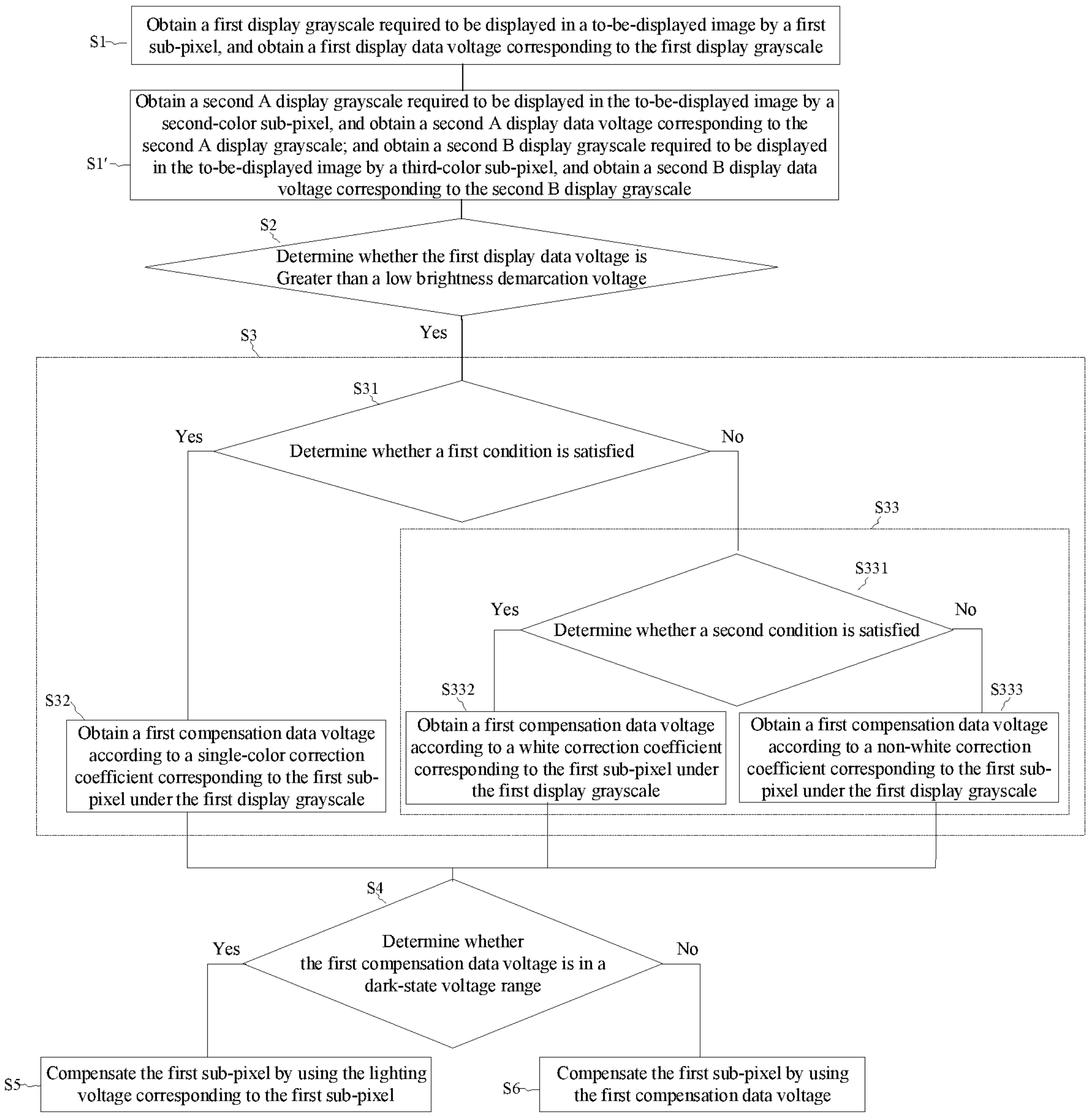
FIG. 7 is still another flowchart of a compensation method for a display panel according to an embodiment of the present disclosure.

FIG. 7 is still another flowchart of a compensation method for a display panel according to an embodiment of the present disclosure. In an embodiment, as shown in FIG. 7, step S1' may include: obtaining a second A display grayscale G1_21 required to be displayed in the to-be-displayed image by the second-color sub-pixel 21, and obtaining a second A display data voltage V1_21 corresponding to the second A display grayscale G1_21; and obtaining a second B display grayscale G1_22 required to be displayed in the to-be-displayed image by the third-color sub-pixel 22, and obtaining a second B display data voltage V2_d1 corresponding to the second B display grayscale G1_22.

Based on this, in an embodiment of the present disclosure, step S31 may include: determining whether a first condition is satisfied, the first condition being: the second A display data voltage V1_21 being greater than the lighting voltage V2_d1 corresponding to the second-color sub-pixel 21, and at the same time, the second B display data voltage V2_d1 being greater than a lighting voltage V2_d2 corresponding to the third-color sub-pixel 22.

When the second sub-pixel 2 includes the second-color sub-pixel 21 and the third-color sub-pixel 22, light emission of both the second-color sub-pixel 21 and the third-color sub-pixel 22 may be determined when it is determined whether a display data voltage of the second sub-pixel 2 is greater than a lighting voltage Vd_2 corresponding to the second sub-pixel 2, so that it can be more accurately determined whether the to-be-displayed image is a single-color image having the first color.

Further, referring to FIG. 7 again, when it is determined that the first condition is not satisfied, in an embodiment of the present disclosure, step S33 may include the following steps.

In step S331, it is determined whether a second condition is satisfied, the first condition being: the second A display data voltage V1_21 being smaller than the lighting voltage V2_d1 corresponding to the second-color sub-pixel 21, and at the same time, the second B display data voltage V2_d1 being smaller than a lighting voltage V2_d2 corresponding to the third-color sub-pixel 22; if yes, step S332 is performed; and if not, step S333 is performed.

In step S332, the first compensation data voltage V2_1 is obtained according to a white correction coefficient Gain_M1 corresponding to the first sub-pixel 1 under the first display grayscale G1_1.

In step S333, the first compensation data voltage V2_1 is obtained according to a non-white correction coefficient Gain_M2 corresponding to the first sub-pixel 1 under the first display grayscale G1_1.

It should be noted that the white correction coefficient Gain_M1 can be pre-configured according to a white multi-color image, and the non-white correction coefficient Gain_M2 can be pre-configured according to a non-white multi-color image. The white multi-color image refers to an image displayed when the sub-pixels having three colors all emit light. The non-white multi-color image refers to an image displayed when the sub-pixels having only two colors emit light.

When it is determined that both the second-color sub-pixel 21 and the third-color sub-pixel 22 emit light, current leakage exists between the first-color sub-pixel 11 and the second-color sub-pixel 21 and the third-color sub-pixel 22 that are adjacent thereto, in which case the white correction coefficient Gain_M1 obtained according to the white multi-color image is more suitable. In this case, the white correction coefficient Gain_M1 is called to obtain the first compensation data voltage V2_1, and the first compensation data voltage V2_1 better matches the to-be-displayed image required to be displayed.

When it is determined that only one of the second-color sub-pixel 21 and the third-color sub-pixel 22 emits light, a difference exists between current leakage of sub-pixels under the non-white multi-color image and under the white multi-color image, in which case the white correction coefficient Gain_M1 obtained according to the white multi-color image is no longer suitable. In this case, the non-white correction coefficient Gain_M2 is called to obtain the first compensation data voltage V2_1, and the first compensation data voltage V2_1 better matches the non-white multi-color image required to be displayed, so as to optimize a visual effect of the to-be-displayed image.

Figure 8:
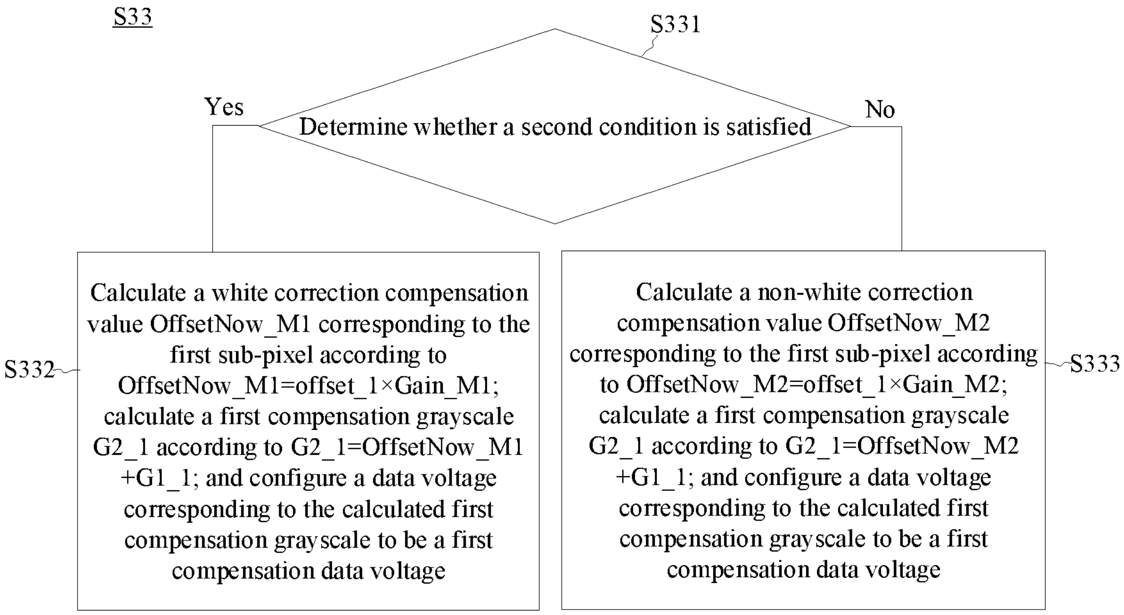
FIG. 8 is still another flowchart of a compensation method for a display panel according to an embodiment of the present disclosure.

FIG. 8 is still another flowchart of a compensation method for a display panel according to an embodiment of the present disclosure. Further, as shown in FIG. 8, in an embodiment, step S332 may include: calculating a white correction compensation value OffsetNow_M1 corresponding to the first sub-pixel 1 according to OffsetNow_M1=offset_1×Gain_M1, where offset_1 denotes a compensation coefficient corresponding to the first sub-pixel 1 under the first display grayscale G1_1, and Gain_M1 denotes the white correction coefficient Gain_M1 corresponding to the first sub-pixel 1 under the first display grayscale G1_1; calculating a first compensation grayscale G2_1 according to G2_1=OffsetNow_M1+G1_1, where G1_1 denotes the first display grayscale G1_1; and configuring a data voltage corresponding to the calculated first compensation grayscale to be the first compensation data voltage V2_1.

When it is determined that the to-be-displayed image is a white multi-color image, the first compensation grayscale can be obtained according to the calculated white correction compensation value, so that the further obtained first compensation data voltage V2_1 is the first compensation data voltage V2_1 that matches the white multi-color image. If compensation is performed subsequently by using the first compensation data voltage V2_1, a compensation effect on the white multi-color image can be optimized.

Further, referring to FIG. 8 again, in an embodiment, step S333 may include: calculating a non-white correction compensation value OffsetNow_M2 corresponding to the first sub-pixel 1 according to OffsetNow_M2=offset_1×Gain_M2, where offset_1 denotes a compensation coefficient corresponding to the first sub-pixel 1 under the first display grayscale G1_1, and Gain_M2 denotes the non-white correction coefficient Gain_M2; calculating a first compensation grayscale G2_1 according to G2_1=OffsetNow_M2+G1_1, where G1_1 denotes the first display grayscale G1_1; and configuring a data voltage corresponding to the calculated first compensation grayscale to be the first compensation data voltage V2_1.

When it is determined that the to-be-displayed image is a non-white multi-color image, the first compensation grayscale can be obtained according to the calculated non-white correction compensation value, so that the further obtained first compensation data voltage V2_1 is the first compensation data voltage V2_1 that matches the non-white multi-color image. If compensation is performed subsequently by using the first compensation data voltage V2_1, a compensation effect on the non-white multi-color image can be optimized.

Figure 9:
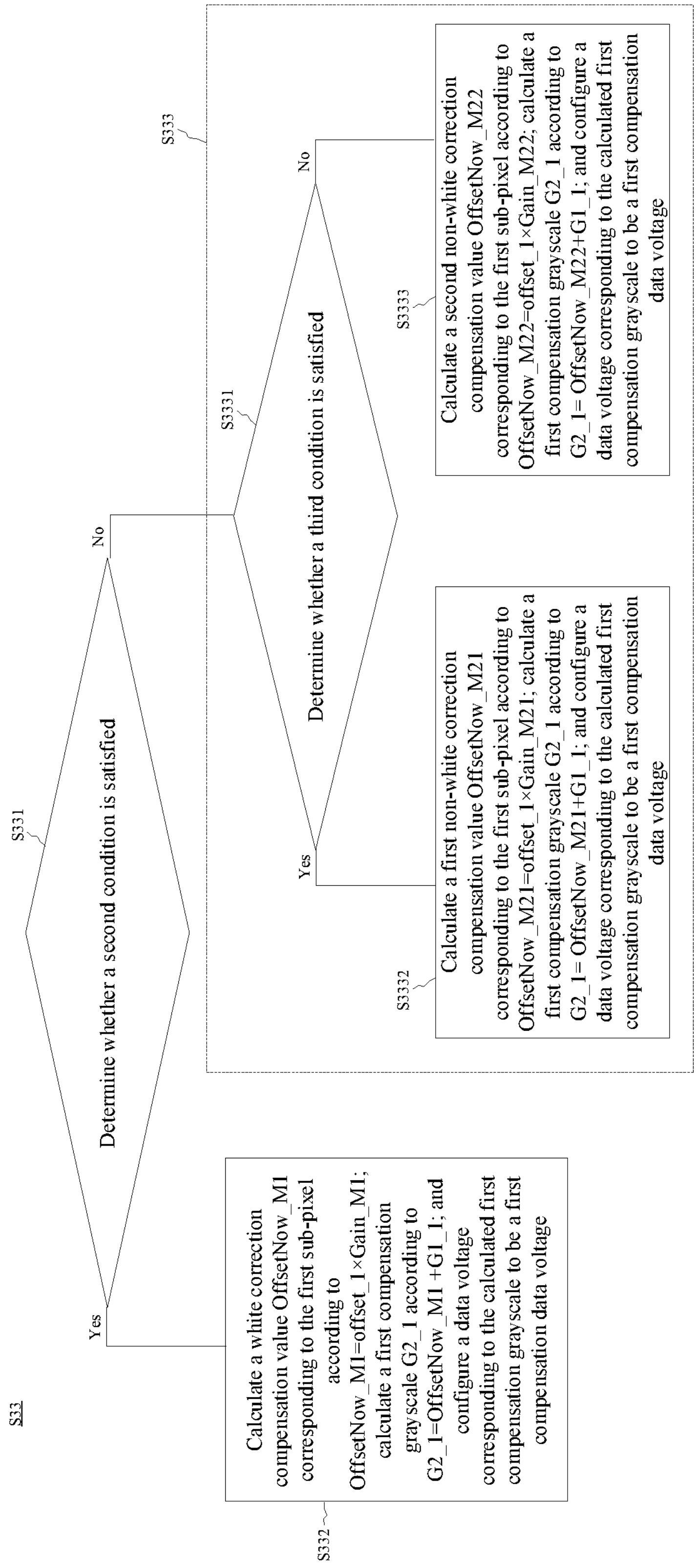
FIG. 9 is still another flowchart of a compensation method for a display panel according to an embodiment of the present disclosure.

In a sample embodiment, as shown in FIG. 9, which is still another flowchart of a compensation method for a display panel according to an embodiment of the present disclosure, step S333 may include the following steps.

In step S3331, it is determined whether a third condition is satisfied, the third condition being: the second A display data voltage V1_21 being smaller than the lighting voltage V2_d1 corresponding to the second-color sub-pixel 21, and at the same time, the second B display data voltage V2_d1 being greater than a lighting voltage V2_d2 corresponding to the third-color sub-pixel 22; if yes, step S3332 is performed; and if not, step S3333 is performed.

In step S3332, a first non-white correction compensation value OffsetNow_M21 corresponding to the first sub-pixel 1 is calculated according to OffsetNow_M21=offset_1×Gain_M21, where offset_1 denotes a compensation coefficient corresponding to the first sub-pixel 1 under the first display grayscale G1_1, and Gain_M21 denotes the first non-white correction coefficient Gain_M2 corresponding to the first sub-pixel 1 under the first display grayscale G1_1; calculating a first compensation grayscale G2_1 according to G2_1=OffsetNow_M21+G1_1, where G1_1 denotes the first display grayscale G1_1; and configuring a data voltage corresponding to the calculated first compensation grayscale to be the first compensation data voltage V2_1.

In step S3333, a second non-white correction compensation value OffsetNow_M22 corresponding to the first sub-pixel 1 is calculated according to OffsetNow_M22=offset_1×Gain_M22, where offset_1 denotes a compensation coefficient corresponding to the first sub-pixel 1 under the first display grayscale G1_1, and Gain_M22 denotes a second non-white correction coefficient Gain_M2 corresponding to the first sub-pixel 1 under the first display grayscale G1_1; calculating a first compensation grayscale G2_1 according to G2_1=OffsetNow_M22+G1_1, where G1_1 denotes the first display grayscale G1_1; and configuring a data voltage corresponding to the calculated first compensation grayscale to be the first compensation data voltage V2_1.

The first non-white correction coefficient Gain_M21 can be pre-configured according to a first non-white multi-color image, and the second non-white correction coefficient Gain_M22 can be pre-configured by debugging according to a second non-white multi-color image. When the display panel displays the first non-white multi-color image, the first-color sub-pixel 11 and the second-color sub-pixel 21 emit light, while the third-color sub-pixel 22 does not emit light. When the display panel displays the second non-white multi-color image, the first-color sub-pixel 11 and the third-color sub-pixel 22 emit light, while the second-color sub-pixel 21 does not emit light.

In the first non-white multi-color image and the second non-white multi-color image, since the sub-pixels having two colors that emit light are different from each other, current leakage between adjacent sub-pixels may also vary. Therefore, in this embodiment of the present disclosure, when it is determined that the to-be-displayed image is a white multi-color image, it is further determined whether the to-be-displayed image is the first non-white multi-color image or the second non-white multi-color image, and then the first compensation data voltage V2_1 is obtained by selecting the first non-white correction coefficient Gain_M21 or the second non-white correction coefficient Gain_M22. The first compensation data voltage V2_1 better matches the non-white multi-color image that is actually displayed, so that the compensation is more accurate.

It should be noted that, in step S5, when the first sub-pixel 1 is compensated by using the lighting voltage Vd_1 corresponding to the first sub-pixel 1, it is obtained according to grayscale-voltage mapping that a grayscale corresponding to the lighting voltage under the image is a lighting grayscale G1_d, and a final actual compensation value offsetReal is G1_d-G1_1. When the first sub-pixel 1 is compensated by using the first compensation data voltage V2_1, the final actual compensation value offsetReal is identical with the single-color correction compensation value OffsetNow_P corresponding to the first sub-pixel 1 finally determined in step S32, or identical with the multi-color correction compensation value OffsetNow_M corresponding to the first sub-pixel 1 finally determined in step S33.

Figure 10:
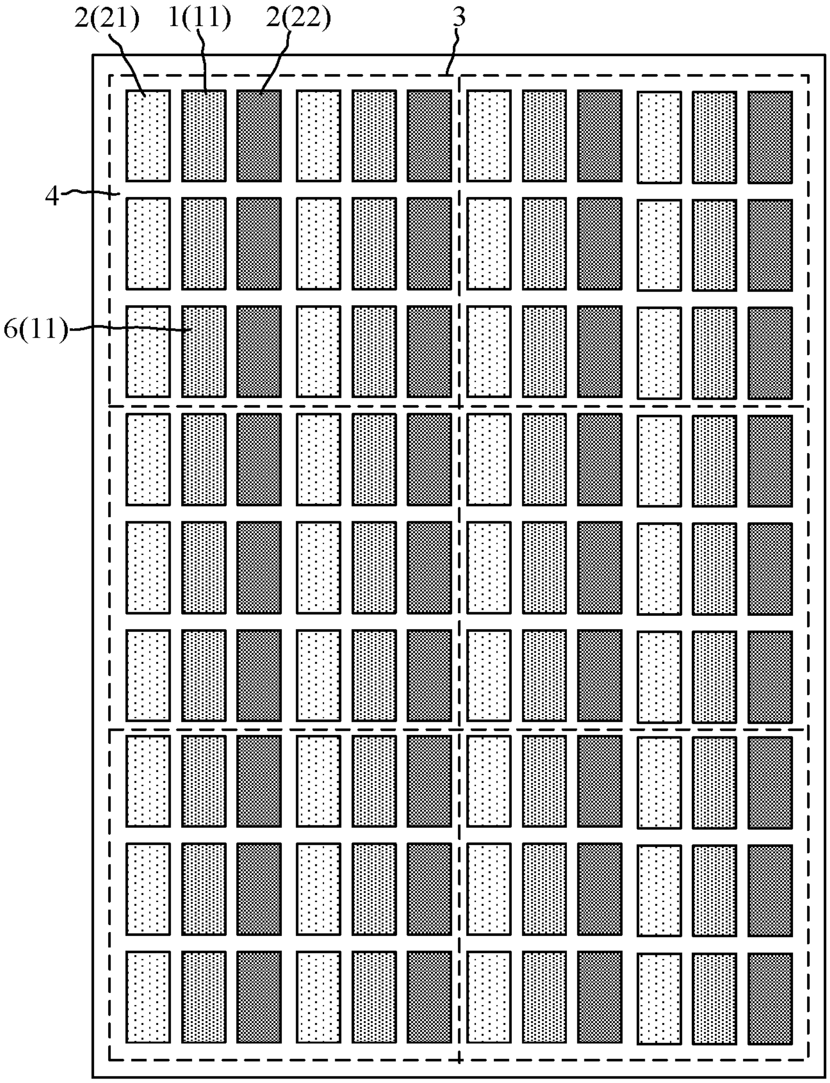
FIG. 10 is another top view of a display panel according to an embodiment of the present disclosure.
Figure 11:
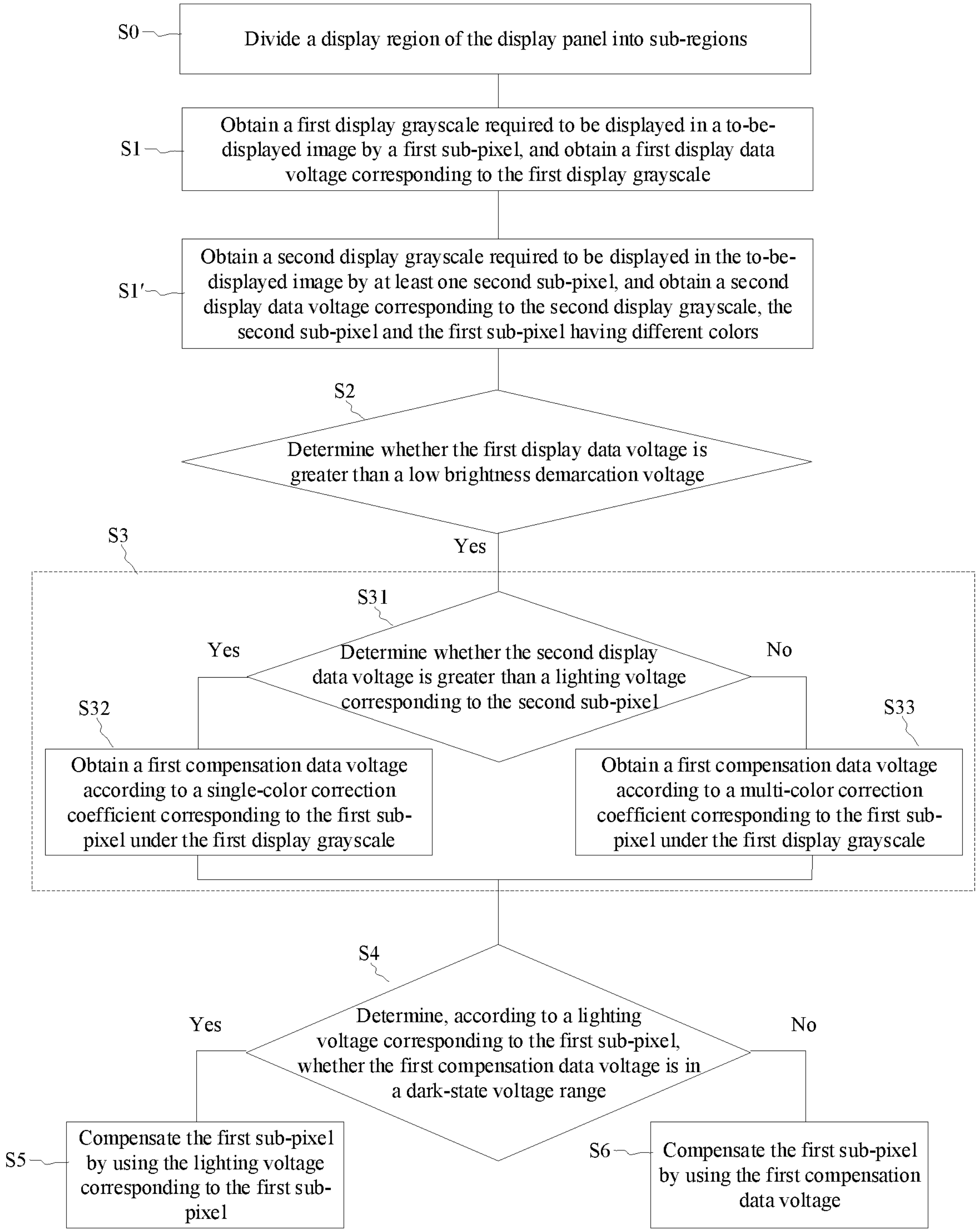
FIG. 11 is still another flowchart of a compensation method for a display panel according to an embodiment of the present disclosure.

FIG. 10 is another top view of a display panel according to an embodiment of the present disclosure, and FIG. 11 is still another flowchart of a compensation method for a display panel according to an embodiment of the present disclosure. In a sample embodiment, as shown in FIG. 10 and FIG. 11, the compensation method further includes the following steps.

In step S0, a display region 3 of the display panel is divided into sub-regions 4.

In an embodiment, step S1' may include: obtaining a second display grayscale G1_2 required to be displayed in the to-be-displayed image by at least one second sub-pixel 2 that is located in a same sub-region 4 as the first sub-pixel 1, and obtaining a second display data voltage V1_2 corresponding to the second display grayscale G1_2.

In the above driving manner, the second display data voltage V1_2 of the second sub-pixel 2 located in the same sub-region 4 as the first sub-pixel 1 is obtained. Therefore, determining whether to be a single-color image or a multi-color image is determining a state of an image displayed in the sub-region 4. In this case, the sub-region 4 of the display panel can be compensated, and the compensation is more accurate. For example, when an image displayed in one sub-region 4 is a single-color image and an image displayed in another sub-region 4 is a multi-color image, differentiated compensation may be performed on the first sub-pixels 1 in the two sub-regions 4, so as to optimize the compensation effect.

Figure 12:
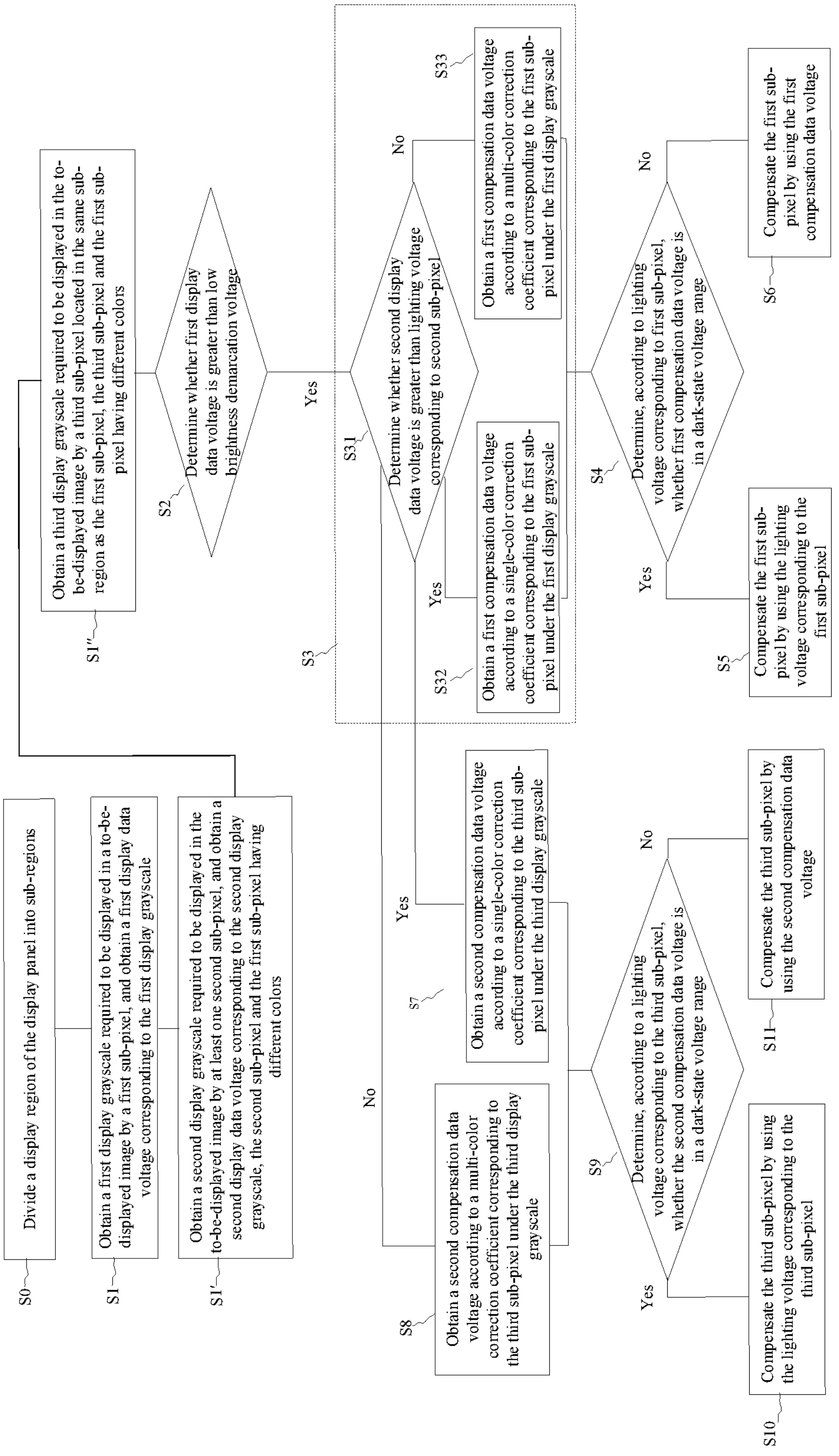
FIG. 12 is still another flowchart of a compensation method for a display panel according to an embodiment of the present disclosure.

In a sample embodiment, referring to FIG. 10, as shown in FIG. 12, which is still another flowchart of a compensation method for a display panel according to an embodiment of the present disclosure, the compensation method further includes the following steps.

In step S0, a display region 3 of the display panel is divided into sub-regions 4.

In step S1', a third display grayscale required to be displayed in the to-be-displayed image by a third sub-pixel 6 located in the same sub-region 4 as the first sub-pixel 1 is obtained, the third sub-pixel 6 and the first sub-pixel 1 having a same color.

When it is determined that the second display data voltage V1_2 is greater than the lighting voltage Vd_2 corresponding to the second sub-pixel 2, the compensation method further includes step S7: obtaining a second compensation data voltage V2_2 according to a single-color correction coefficient Gain_P corresponding to the third sub-pixel 6 under the third display grayscale.

When it is determined that the second display data voltage V1_2 is smaller than or equal to the lighting voltage Vd_2 corresponding to the second sub-pixel 2, the compensation method further includes step S8: obtaining a second compensation data voltage V2_2 according to a multi-color correction coefficient Gain_M corresponding to the third sub-pixel 6 under the third display grayscale.

The compensation method further includes the following steps.

In step S9, it is determined, according to a lighting voltage V3_d corresponding to the third sub-pixel 6, whether the second compensation data voltage V2_2 is in a dark-state voltage range, if yes, step S10 is performed, and if not, step S11 is performed.

In step S10, the third sub-pixel 6 is compensated by using the lighting voltage V3_d corresponding to the third sub-pixel 6.

In step S11, the third sub-pixel 6 is compensated by using the second compensation data voltage V2_2.

After it is determined according to the second display data voltage V1_2 of the second sub-pixel 2 whether a single-color image or a multi-color image is displayed in the sub-region 4 of the first sub-pixel 1, for the third sub-pixel 6 that is located in the same sub-region 4 as the first sub-pixel 1 and has the same color as the first sub-pixel 1, the second compensation data voltage V2_2 of the third sub-pixel 6 can be obtained by directly calling the single-color correction coefficient Gain_P or the multi-color correction coefficient Gain_M corresponding to the third sub-pixel 6 according to the determined single-color image or multi-color image, without needing to separately determine which type of correction coefficient is selected for the third sub-pixel 6, thereby saving compensation time.

In a sample embodiment, for example, step S1' may include: obtaining a second display grayscale G1_2 required to be displayed in the to-be-displayed image by at least one second sub-pixel 2 adjacent to the first sub-pixel 1, and obtaining a second display data voltage V1_2 corresponding to the second display grayscale G1_2.

When the second sub-pixel 2 is adjacent to the first sub-pixel 1 and the second sub-pixel 2 emits light, current leakage between the second sub-pixel 2 and the first sub-pixel 1 is more significant. Therefore, whether the first sub-pixel 1 is affected by current leakage can be determined more accurately by determining whether the second sub-pixel 2 emits light, and then whether the to-be-displayed image is a single-color image or a multi-color image can be determined according to whether the second sub-pixel 2 emits light, so as to compensate the first sub-pixel 1 more accurately.

In a sample embodiment, for example, in step S4, a process of determining, according to a lighting voltage Vd_1 corresponding to the first sub-pixel 1, whether the first compensation data voltage V2_1 is in a dark-state voltage range may include: determining whether the first compensation data voltage V2_1 is greater than the lighting voltage Vd_1 corresponding to the first sub-pixel 1; or determining whether a difference between the first compensation data voltage V2_1 and the first display data voltage V1_1 is greater than a difference between the lighting voltage Vd_1 corresponding to the first sub-pixel 1 and the low brightness demarcation voltage V_Cut.

In the above two manners, whether the first compensation data voltage V2_1 is in the dark-state voltage range can be determined accurately, so that an accurate selection can be made subsequently on whether the first sub-pixel 1 is compensated according to the first compensation data voltage V2_1 or the lighting voltage Vd_1 corresponding to the first sub-pixel 1.

Figure 13:
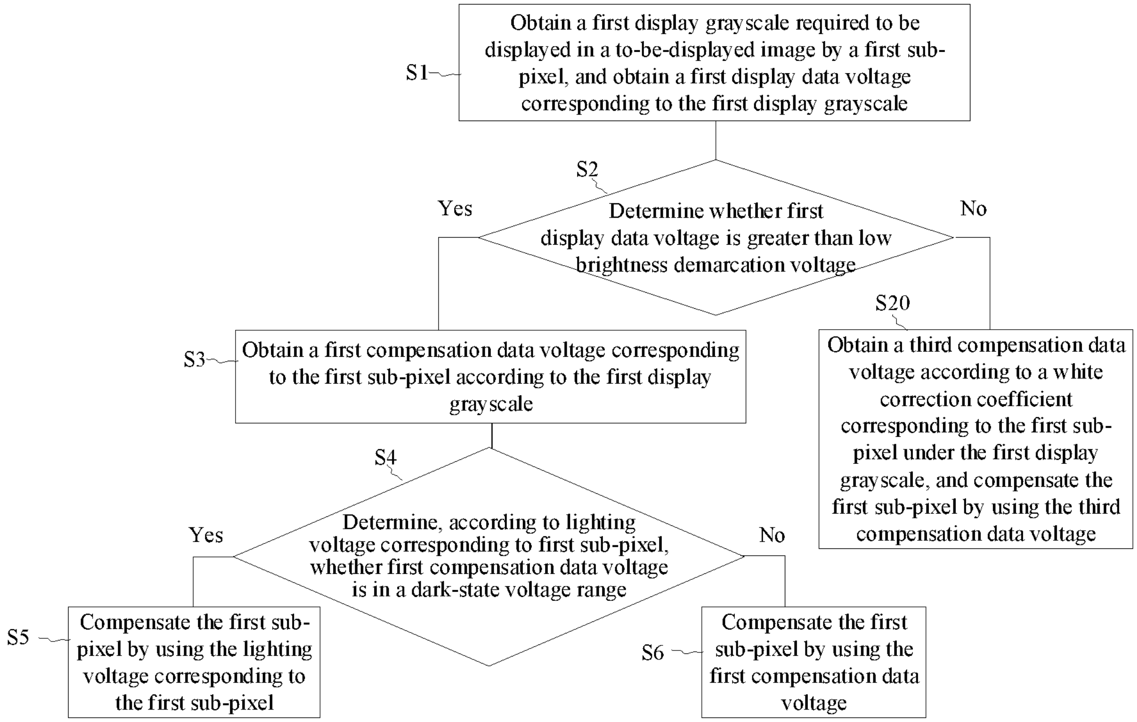
FIG. 13 is still another flowchart of a compensation method for a display panel according to an embodiment of the present disclosure.

FIG. 13 is still another flowchart of a compensation method for a display panel according to an embodiment of the present disclosure. In a sample embodiment, as shown in FIG. 13, when it is determined that the first display data voltage V1_1 is smaller than or equal to the low brightness demarcation voltage V_Cut, the compensation method further includes the following steps.

In step S20, a third compensation data voltage V2_3 is obtained according to a white correction coefficient Gain_M1 corresponding to the first sub-pixel 1 under the first display grayscale G1_1, and the first sub-pixel 1 is compensated by using the third compensation data voltage V2_3.

When the first display data voltage V1_1 is smaller than the low brightness demarcation voltage V_Cut, a grayscale value of the first display grayscale G1_1 is large, and the first sub-pixel 1 displays a high grayscale. On the one hand, the first sub-pixel 1 is not prone to the problem of color cast after compensation. On the other hand, a compensation effect under the high grayscale does not vary evidently in the switching between the single-color image and the multi-color image. Therefore, when it is determined that the first sub-pixel 1 displays a high grayscale, the third compensation data voltage V2_3 can be obtained directly according to the white correction coefficient Gain_M1, and then the first sub-pixel 1 is compensated by using the third compensation data voltage V2_3.

Figure 14:
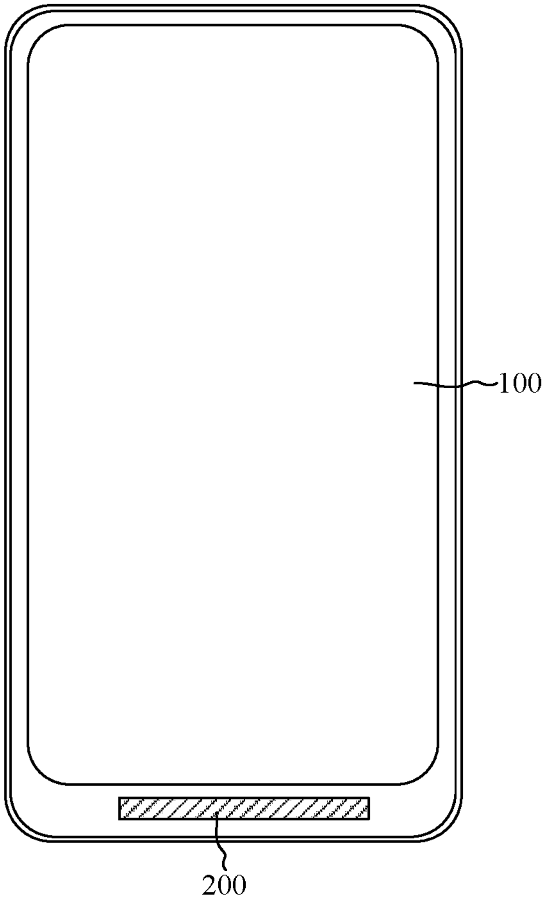
FIG. 14 is a schematic structural diagram of a display device according to an embodiment of the present disclosure.
Figure 15:
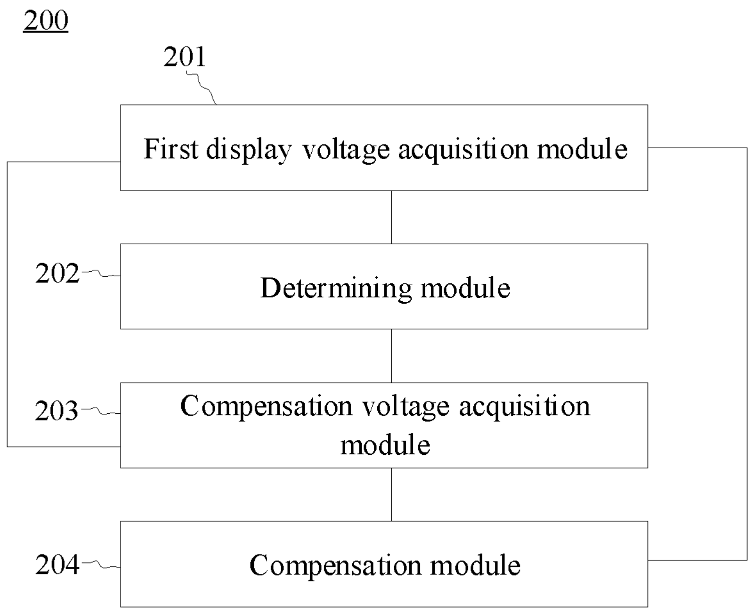
FIG. 15 is a schematic structural diagram of a driving chip according to an embodiment of the present disclosure.

According to a same inventive technology, an embodiment of the present disclosure further provides a display device. Referring to FIG. 1 and FIG. 2, as shown in FIG. 14 and FIG. 15, where FIG. 14 is a schematic structural diagram of a display device according to an embodiment of the present disclosure, and FIG. 15 is a schematic structural diagram of a driving chip 200 according to an embodiment of the present disclosure, the display device includes a display panel 100 and a driving chip 200. The driving chip 200 includes a first display voltage acquisition module 201, a determining module 202, a compensation voltage acquisition module 203, and a compensation module 204.

The first display voltage acquisition module 201 is configured to obtain a first display grayscale G1_1 required to be displayed in a to-be-displayed image by a first sub-pixel 1, and obtain a first display data voltage V1_1 corresponding to the first display grayscale G1_1.

The determining module 202 is electrically connected to the first display voltage acquisition module 201, and is configured to determine whether the first display data voltage V1_1 is greater than a low brightness demarcation voltage V_Cut; and if yes, issue a first control instruction.

The compensation voltage acquisition module 203 is electrically connected to the first display voltage acquisition module 201 and the determining module 202, respectively, and is configured to obtain a first compensation data voltage V2_1 corresponding to the first sub-pixel 1 according to the first display grayscale G1_1 when the first control instruction is received.

The compensation module 204 is electrically connected to the first display voltage acquisition module 201 and the compensation voltage acquisition module 203, respectively, and is configured to determine, according to a lighting voltage Vd_1 corresponding to the first sub-pixel 1, whether the first compensation data voltage V2_1 is in a dark-state voltage range; and if yes, compensate the first sub-pixel 1 by using the lighting voltage Vd_1 corresponding to the first sub-pixel 1, and if not, compensate the first sub-pixel 1 by using the first compensation data voltage V2_1.

In the embodiments of the present disclosure, when the compensation module 204 determines, according to the lighting voltage Vd_1 corresponding to the first sub-pixel 1, that the first compensation data voltage V2_1 is in the dark-state voltage range, the lighting voltage Vd_1 corresponding to the first sub-pixel 1 is selected to compensate the first sub-pixel 1, so that the first sub-pixel 1 after compensation can emit light slightly (i.e., not completely emit no light), thereby ameliorating a color cast phenomenon to some extent.

Moreover, the lighting voltage corresponding to the sub-pixel is only related to a threshold current of the light-emitting element. Therefore, the lighting voltages corresponding to the sub-pixels having a same color are all the same. Therefore, when the compensation module 204 determines, according to the lighting voltage Vd_1 corresponding to the first sub-pixel 1, whether the first compensation data voltage V2_1 is in a dark-state voltage range, only several lighting voltages are required to be pre-configured for sub-pixels having different colors, thereby greatly reducing an amount of data required to be stored under a premise of effectively alleviating the color cast after low-grayscale compensation.

Figure 16:
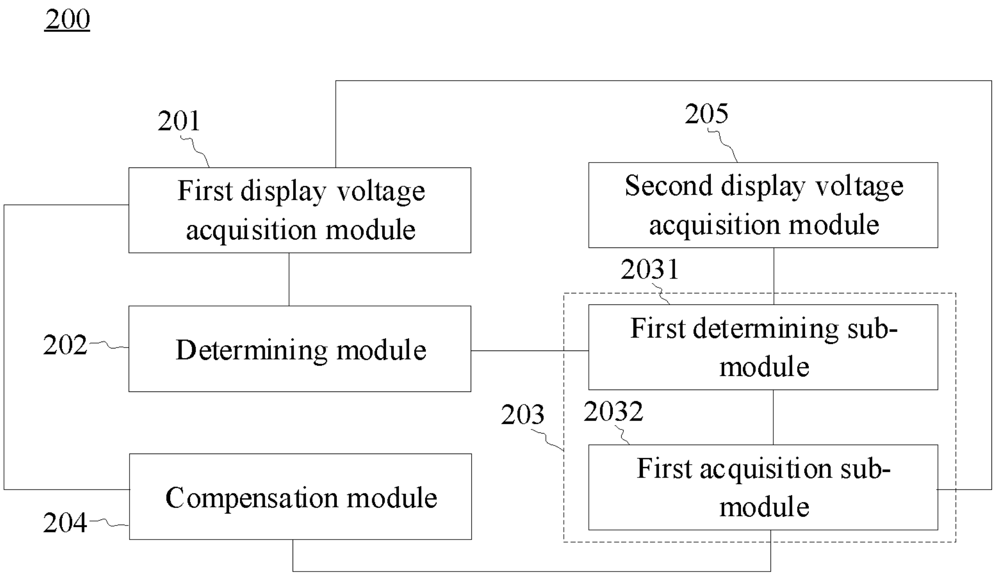
FIG. 16 is another schematic structural diagram of a driving chip according to an embodiment of the present disclosure.

In a sample embodiment, as shown in FIG. 16, which is another schematic structural diagram of a driving chip 200 according to an embodiment of the present disclosure, the driving chip 200 further includes a second display voltage acquisition module 205. The second display voltage acquisition module 205 is configured to obtain a second display grayscale G1_2 required to be displayed in the to-be-displayed image by at least one second sub-pixel 2, and obtain a second display data voltage V1_2 corresponding to the second display grayscale G1_2, the second sub-pixel 2 and the first sub-pixel 1 having different colors.

The compensation voltage acquisition module 203 includes a first determining sub-module 2031 and a first acquisition sub-module 2032. The first determining sub-module 2031 is electrically connected to the determining module 202 and the second display voltage acquisition module 205, respectively, and is configured to determine whether the second display data voltage V1_2 is greater than a lighting voltage Vd_2 corresponding to the second sub-pixel 2 when the first control instruction is received; and if yes, issue a single-color compensation instruction; and if not, issue a multi-color compensation instruction. The first acquisition sub-module 2032 is electrically connected to the first determining sub-module 2031, the first display voltage acquisition module 201, and the compensation module 204, respectively, and is configured to obtain the first compensation data voltage V2_1 according to a single-color correction coefficient Gain_P corresponding to the first sub-pixel 1 under the first display grayscale G1_1 when the single-color compensation instruction is received, and obtain the first compensation data voltage V2_1 according to a multi-color correction coefficient Gain_M corresponding to the first sub-pixel 1 under the first display grayscale G1_1 when the multi-color compensation instruction is received.

Figure 17:
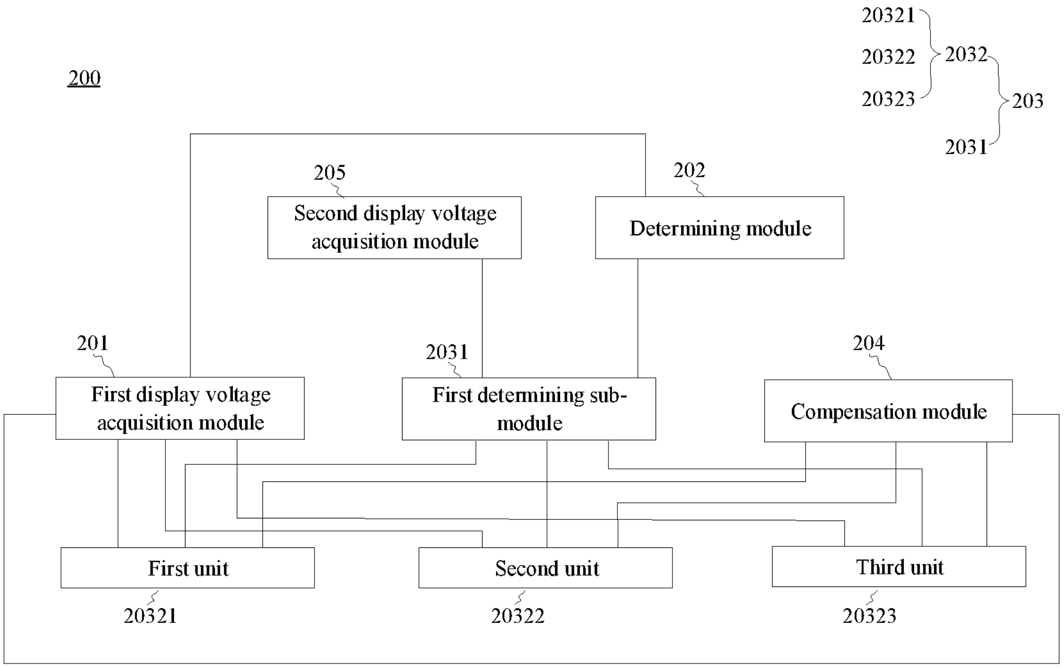
FIG. 17 is another schematic structural diagram of a driving chip according to an embodiment of the present disclosure.

Further, referring to FIG. 1, as shown in FIG. 17, which is another schematic structural diagram of a driving chip 200 according to an embodiment of the present disclosure, the display panel 100 includes a first-color sub-pixel 11, a second-color sub-pixel 21, and a third-color sub-pixel 22. The first sub-pixel 1 is the first-color sub-pixel 11, and the second sub-pixel 2 includes the second-color sub-pixel 21 and the third-color sub-pixel 22.

The second display voltage acquisition module 205 is configured to obtain a second A display grayscale G1_21 required to be displayed in the to-be-displayed image by the second-color sub-pixel 21, and obtain a second A display data voltage V1_21 corresponding to the second A display grayscale G1_21; and obtain a second B display grayscale G1_22 required to be displayed in the to-be-displayed image by the third-color sub-pixel 22, and obtain a second B display data voltage V2_d1 corresponding to the second B display grayscale G1_22.

The first determining sub-module 2031 is configured to determine whether a first condition is satisfied when the first control instruction is received, the first condition being: the second A display data voltage V1_21 being greater than the lighting voltage V2_d1 corresponding to the second-color sub-pixel 21, and at the same time, the second B display data voltage V2_d1 being greater than a lighting voltage V2_d2 corresponding to the third-color sub-pixel 22; and if yes, issue a single-color compensation instruction; and if not, determine whether a second condition is satisfied, the second condition being: the second A display data voltage V1_21 being smaller than the lighting voltage V2_d1 corresponding to the second-color sub-pixel 21, and at the same time, the second B display data voltage V2_d1 being smaller than the lighting voltage V2_d2 corresponding to the third-color sub-pixel 22; and if yes, issue a white compensation instruction; and if not, issue a non-white compensation instruction.

The first acquisition sub-module 2032 includes a first unit 20321, a second unit 20322, and a third unit 20323.

The first unit 20321 is electrically connected to the first determining sub-module 2031, the first display voltage acquisition module 201, and the compensation module 204, respectively, and is configured to obtain the first compensation data voltage V2_1 according to a single-color correction coefficient Gain_P corresponding to the first sub-pixel 1 under the first display grayscale G1_1 when the single-color compensation instruction is received.

The second unit 20322 is electrically connected to the first determining sub-module 2031, the first display voltage acquisition module 201, and the compensation module 204, respectively, and is configured to obtain the first compensation data voltage V2_1 according to a white correction coefficient Gain_M1 corresponding to the first sub-pixel 1 under the first display grayscale G1_1 when the white compensation instruction is received.

The third unit 20323 is electrically connected to the first determining sub-module 2031, the first display voltage acquisition module 201, and the compensation module 204, respectively, and is configured to obtain the first compensation data voltage V2_1 according to a non-white correction coefficient Gain_M2 corresponding to the first sub-pixel 1 under the first display grayscale G1_1 when the non-white compensation instruction is received.

When the second sub-pixel 2 includes the second-color sub-pixel 21 and the third-color sub-pixel 22, light emission of both the second-color sub-pixel 21 and the third-color sub-pixel 22 can be determined when it is determined whether a display data voltage of the second sub-pixel 2 is greater than a lighting voltage Vd_2 corresponding to the second sub-pixel 2, so that it can be more accurately determined whether the to-be-displayed image is a single-color image having the first color.

Moreover, when it is determined that both the second-color sub-pixel 21 and the third-color sub-pixel 22 emit light, current leakage exists between the first-color sub-pixel 11 and the second-color sub-pixel 21 and the third-color sub-pixel 22 that are adjacent thereto, in which case the white correction coefficient Gain_M1 obtained according to the white multi-color image is more suitable. In this case, the white correction coefficient Gain_M1 is called to obtain the first compensation data voltage V2_1, and the first compensation data voltage V2_1 better matches the to-be-displayed image required to be displayed.

When it is determined that only one of the second-color sub-pixel 21 and the third-color sub-pixel 22 emits light, a difference exists between current leakage of sub-pixels under the non-white multi-color image and under the white multi-color image, in which case the white correction coefficient Gain_M1 obtained according to the white multi-color image is no longer suitable. In this case, the non-white correction coefficient Gain_M2 is called to obtain the first compensation data voltage V2_1, and the first compensation data voltage V2_1 better matches the non-white multi-color image required to be displayed, so as to optimize a visual effect of the to-be-displayed image.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A compensation method for a display panel, comprising:

obtaining a first display grayscale required to be displayed in a to-be-displayed image by a first sub-pixel, and obtaining a first display data voltage corresponding to the first display grayscale, the first display grayscale being positively correlated to a first display brightness, and the first display data voltage being negatively correlated to the first display grayscale;

determining whether the first display data voltage is greater than a preset low-brightness demarcation voltage; and if yes, obtaining a first compensation data voltage corresponding to the first sub-pixel according to the first display grayscale; and determining, according to a lighting voltage corresponding to the first sub-pixel, whether the first compensation data voltage is in a dark-state voltage range; and if yes, compensating the first sub-pixel by using the lighting voltage corresponding to the first sub-pixel, and if not, compensating the first sub-pixel by using the first compensation data voltage corresponding to the first sub-pixel, wherein determining, according to a lighting voltage corresponding to the first sub-pixel, whether the first compensation data voltage is in a dark-state voltage range comprises: determining whether the first compensation data voltage is greater than a lighting voltage corresponding to the first sub-pixel.

2. The compensation method as described in claim 1, further comprising:

obtaining a second display grayscale required to be displayed in the to-be-displayed image by at least one second sub-pixel, and obtaining a second display data voltage corresponding to the second display grayscale, wherein the second sub-pixel and the first sub-pixel have different colors, wherein said obtaining the first compensation data voltage corresponding to the first sub-pixel according to the first display grayscale comprises:

determining whether the second display data voltage is greater than a lighting voltage corresponding to the second sub-pixel; and if yes, obtaining the first compensation data voltage according to a single-color correction coefficient corresponding to the first sub-pixel under the first display grayscale, and if not, obtaining the first compensation data voltage according to a multi-color correction coefficient corresponding to the first sub-pixel under the first display grayscale.

3. The compensation method as described in claim 2, wherein said obtaining the first compensation data voltage according to the single-color correction coefficient corresponding to the first sub-pixel under the first display grayscale comprises:

calculating a single-color correction compensation value OffsetNow_P corresponding to the first sub-pixel according to OffsetNow_P=offset_1×Gain_P, where offset_1 denotes a compensation coefficient corresponding to the first sub-pixel under the first display grayscale, and Gain_P denotes the single-color correction coefficient corresponding to the first sub-pixel under the first display grayscale; and calculating a first compensation grayscale G2_1 according to G2_1=OffsetNow_P+G1_1, where G1_1 denotes the first display grayscale; and configuring a data voltage corresponding to the calculated first compensation grayscale to be the first compensation data voltage.

4. The compensation method as described in claim 2, wherein said obtaining the first compensation data voltage according to a multi-color correction coefficient corresponding to the first sub-pixel under the first display grayscale comprises:

calculating a multi-color correction compensation value OffsetNow_M corresponding to the first sub-pixel according to OffsetNow_M=offset_1×Gain_M, where offset_1 denotes a compensation coefficient corresponding to the first sub-pixel under the first display grayscale, and Gain_M denotes a multi-color correction coefficient corresponding to the first sub-pixel under the first display grayscale; and calculating a first compensation grayscale G2_1 according to G2_ 1=OffsetNow_M+G1_1, where G1_1 denotes the first display grayscale; and configuring a data voltage corresponding to the calculated first compensation grayscale to be the first compensation data voltage.

5. The compensation method as described in claim 2, wherein the display panel comprises a first-color sub-pixel, a second-color sub-pixel, and a third-color sub-pixel, wherein the first sub-pixel is the first-color sub-pixel, and the at least one second sub-pixel comprises the second-color sub-pixel and the third-color sub-pixel;

wherein said obtaining a second display grayscale required to be displayed in the to-be-displayed image by at least one second sub-pixel, and obtaining a second display data voltage corresponding to the second display grayscale comprises:

obtaining a second A display grayscale required to be displayed in the to-be-displayed image by the second-color sub-pixel, and obtaining a second A display data voltage corresponding to the second A display grayscale; and obtaining a second B display grayscale required to be displayed in the to-be-displayed image by the third-color sub-pixel, and obtaining a second B display data voltage corresponding to the second B display grayscale; and wherein said determining whether the second display data voltage is greater than a lighting voltage corresponding to the second sub-pixel comprises:

determining whether a first condition is satisfied, the first condition being: the second A display data voltage being greater than the lighting voltage corresponding to the second-color sub-pixel, and at the same time, the second B display data voltage being greater than a lighting voltage corresponding to the third-color sub-pixel.

6. The compensation method as described in claim 5, wherein subsequent to determining that the first condition is not satisfied, said obtaining the first compensation data voltage according to a multi-color correction coefficient corresponding to the first sub-pixel under the first display grayscale comprises:

determining whether a second condition is satisfied, the second condition being: the second A display data voltage being smaller than the lighting voltage corresponding to the second-color sub-pixel, and at the same time, the second B display data voltage being smaller than the lighting voltage corresponding to the third-color sub-pixel; and if yes, obtaining the first compensation data voltage according to a white correction coefficient corresponding to the first sub-pixel under the first display grayscale, and if not, obtaining the first compensation data voltage according to a non-white correction coefficient corresponding to the first sub-pixel under the first display grayscale.

7. The compensation method as described in claim 6, wherein obtaining the first compensation data voltage according to a white correction coefficient corresponding to the first sub-pixel under the first display grayscale comprises:

calculating a white correction compensation value OffsetNow_M1 corresponding to the first sub-pixel according to OffsetNow_M1=offset_1×Gain_M1, where offset_1 denotes a compensation coefficient corresponding to the first sub-pixel under the first display grayscale, and Gain_M1 denotes the white correction coefficient corresponding to the first sub-pixel under the first display grayscale; and calculating a first compensation grayscale G2_1 according to G2_1=OffsetNow_M1+G1_1, where G1_1 denotes the first display grayscale; and configuring a data voltage corresponding to the calculated first compensation grayscale to be the first compensation data voltage.

8. The compensation method as described in claim 6, wherein obtaining the first compensation data voltage according to a non-white correction coefficient corresponding to the first sub-pixel under the first display grayscale comprises:

calculating a non-white correction compensation value OffsetNow_M2 corresponding to the first sub-pixel according to OffsetNow_M2=offset_1×Gain_M2, where offset_1 denotes a compensation coefficient corresponding to the first sub-pixel under the first display grayscale, and Gain_M2 denotes the non-white correction coefficient; and calculating a first compensation grayscale G2_1 according to G2_1=OffsetNow_M2+G1_1, where G1_1 denotes the first display grayscale; and configuring a data voltage corresponding to the calculated first compensation grayscale to be the first compensation data voltage.

9. The compensation method as described in claim 6, wherein obtaining the first compensation data voltage according to a non-white correction coefficient corresponding to the first sub-pixel under the first display grayscale comprises:

determining whether a third condition is satisfied, the third condition being: the second A display data voltage being smaller than the lighting voltage corresponding to the second-color sub-pixel, and at the same time, the second B display data voltage being greater than the lighting voltage corresponding to the third-color sub-pixel; and if yes, calculating a first non-white correction compensation value OffsetNow_M21 corresponding to the first sub-pixel according to OffsetNow_M21=offset_1×Gain_M21, where offset_1 denotes a compensation coefficient corresponding to the first sub-pixel under the first display grayscale, and Gain_M21 denotes a first non-white correction coefficient corresponding to the first sub-pixel under the first display grayscale; and calculating a first compensation grayscale G2_1 according to G2_1=OffsetNow_M21+G1_1, where G1_1 denotes the first display grayscale; and configuring a data voltage corresponding to the calculated first compensation grayscale to be the first compensation data voltage; and if not, calculating a second non-white correction compensation value OffsetNow_M22 corresponding to the first sub-pixel according to OffsetNow_M22=offset_1×Gain_M22, where offset_1 denotes the compensation coefficient corresponding to the first sub-pixel under the first display grayscale, and Gain_M22 denotes a second non-white correction coefficient corresponding to the first sub-pixel under the first display grayscale; and calculating a first compensation grayscale G2_1 according to G2_1=OffsetNow_M22+G1_1, where G1_1 denotes the first display grayscale; and configuring a data voltage corresponding to the calculated first compensation grayscale to be the first compensation data voltage.

10. The compensation method as described in claim 2, further comprising:

dividing a display region of the display panel into sub-regions, wherein obtaining a second display grayscale required to be displayed in the to-be-displayed image by at least one second sub-pixel, and obtaining a second display data voltage corresponding to the second display grayscale comprises:

obtaining a second display grayscale required to be displayed in the to-be-displayed image by at least one second sub-pixel located in the same sub-region as the first sub-pixel, and obtaining a second display data voltage corresponding to the second display grayscale.

11. The compensation method as described in claim 2, further comprising:

dividing a display region of the display panel into sub-regions; and obtaining a third display grayscale required to be displayed in the to-be-displayed image by a third sub-pixel located in the same sub-region as the first sub-pixel, wherein the third sub-pixel and the first sub-pixel have a same color;

wherein when it is determined that the second display data voltage is greater than the lighting voltage corresponding to the second sub-pixel, the compensation method further comprises:

obtaining a second compensation data voltage according to a single-color correction coefficient corresponding to the third sub-pixel under the third display grayscale;

wherein when it is determined that the second display data voltage is smaller than or equal to the lighting voltage corresponding to the second sub-pixel, the compensation method further comprises:

obtaining a second compensation data voltage according to a multi-color correction coefficient corresponding to the third sub-pixel under the third display grayscale;

wherein the compensation method further comprises:

determining, according to a lighting voltage corresponding to the third sub-pixel, whether the second compensation data voltage is in the dark-state voltage range; and if yes, compensating the third sub-pixel by using the lighting voltage corresponding to the third sub-pixel, and if not, compensating the third sub-pixel by using the second compensation data voltage.

12. The compensation method as described in claim 2, wherein obtaining a second display grayscale required to be displayed in the to-be-displayed image by at least one second sub-pixel, and obtaining a second display data voltage corresponding to the second display grayscale comprises:

obtaining a second display grayscale obtained to be displayed in the to-be-displayed image by the at least one second sub-pixel adjacent to the first sub-pixel, and obtaining a second display data voltage corresponding to the second display grayscale.

13. The compensation method as described in claim 1, wherein when it is determined that the first display data voltage is smaller than or equal to the preset low-brightness demarcation voltage, the compensation method further comprises:

obtaining a third compensation data voltage according to a white correction coefficient corresponding to the first sub-pixel under the first display grayscale, and compensating the first sub-pixel by using the third compensation data voltage.

14. A display device, comprising a display panel and a driving chip, wherein the driving chip comprises:

a first display voltage acquisition module configured to obtain a first display grayscale required to be displayed in a to-be-displayed image by a first sub-pixel, and obtain a first display data voltage corresponding to the first display grayscale, wherein the first display grayscale is positively correlated to a first display brightness, and the first display data voltage is negatively correlated to the first display grayscale;

a determining module electrically connected to the first display voltage acquisition module, and configured to determine whether the first display data voltage is greater than a preset low-brightness demarcation voltage, and if yes, issue a first control instruction;

a compensation voltage acquisition module electrically connected to the first display voltage acquisition module and the determining module, respectively, and configured to obtain a first compensation data voltage corresponding to the first sub-pixel according to the first display grayscale when the first control instruction is received; and a compensation module electrically connected to the first display voltage acquisition module and the compensation voltage acquisition module, respectively, and configured to determine, according to a lighting voltage corresponding to the first sub-pixel, whether the first compensation data voltage is in a dark-state voltage range; and if yes, compensate the first sub-pixel by using the lighting voltage corresponding to the first sub-pixel, and if not, compensate the first sub-pixel by using the first compensation data voltage, wherein determining, according to a lighting voltage corresponding to the first sub-pixel, whether the first compensation data voltage is in a dark-state voltage range comprises: determining whether the first compensation data voltage is greater than a lighting voltage corresponding to the first sub-pixel.

15. The display device as described in claim 14, wherein the driving chip further comprises a second display voltage acquisition module configured to obtain a second display grayscale required to be displayed in the to-be-displayed image by at least one second sub-pixel, and to obtain a second display data voltage corresponding to the second display grayscale, wherein the second sub-pixel and the first sub-pixel have different colors; and wherein the compensation voltage acquisition module comprises:

a first determining sub-module electrically connected to the determining module and the second display voltage acquisition module, respectively, and configured to, when the first control instruction is received, determine whether the second display data voltage is greater than a lighting voltage corresponding to the second sub-pixel; and if yes, to issue a single-color compensation instruction, and if not, to issue a multi-color compensation instruction; and a first acquisition sub-module electrically connected to the first determining sub-module, the first display voltage acquisition module, and the compensation module, respectively, and configured to, when the single-color compensation instruction is received, obtain the first compensation data voltage according to a single-color correction coefficient corresponding to the first sub-pixel under the first display grayscale, and when the multi-color compensation instruction is received, obtain the first compensation data voltage according to a multi-color correction coefficient corresponding to the first sub-pixel under the first display grayscale.

16. The display device as described in claim 15, wherein the display panel comprises a first-color sub-pixel, a second-color sub-pixel, and a third-color sub-pixel, wherein the first sub-pixel is the first-color sub-pixel, and the at least one second sub-pixel comprises the second-color sub-pixel and the third-color sub-pixel;

wherein the second display voltage acquisition module is configured to obtain a second A display grayscale required to be displayed in the to-be-displayed image by the second-color sub-pixel, and obtain a second A display data voltage corresponding to the second A display grayscale; and obtain a second B display grayscale required to be displayed in the to-be-displayed image by the third-color sub-pixel, and obtain a second B display data voltage corresponding to the second B display grayscale;

wherein the first determining sub-module is configured to:

when the first control instruction is received, determine whether a first condition is satisfied, the first condition being: the second A display data voltage being greater than the lighting voltage corresponding to the second-color sub-pixel, and at the same time, the second B display data voltage being greater than a lighting voltage corresponding to the third-color sub-pixel; and if yes, issue the single-color compensation instruction, and if not, determine whether a second condition is satisfied, the second condition being: the second A display data voltage being smaller than the lighting voltage corresponding to the second-color sub-pixel, and at the same time, the second B display data voltage being smaller than the lighting voltage corresponding to the third-color sub-pixel; and if yes, issue a white compensation instruction, and if not, issue a non-white compensation instruction; and wherein the first acquisition sub-module comprises:

a first unit electrically connected to the first determining sub-module, the first display voltage acquisition module, and the compensation module, respectively, and configured to, when the single-color compensation instruction is received, obtain the first compensation data voltage according to the single-color correction coefficient corresponding to the first sub-pixel under the first display grayscale;

a second unit electrically connected to the first determining sub-module, the first display voltage acquisition module, and the compensation module, respectively, and configured to, when the white compensation instruction is received, obtain the first compensation data voltage according to a white correction coefficient corresponding to the first sub-pixel under the first display grayscale; and a third unit electrically connected to the first determining sub-module, the first display voltage acquisition module, and the compensation module, respectively, and configured to, when the non-white compensation instruction is received, obtain the first compensation data voltage according to a non-white correction coefficient corresponding to the first sub-pixel under the first display grayscale.

* * * * *